(12) United States Patent
Ros-Giralt et al.

(10) Patent No.: US 12,137,051 B1
(45) Date of Patent: Nov. 5, 2024

(54) NETWORK ANALYSIS AND MANAGEMENT BASED ON A QUANTITATIVE THEORY OF BOTTLENECK STRUCTURES

(71) Applicant: Reservoir Labs, Inc., New York, NY (US)

(72) Inventors: Jordi Ros-Giralt, Newport Beach, CA (US); Noah Amsel, New York, NY (US); Sruthi Yellamraju, Germantown, MD (US); Richard A. Lethin, New York, NY (US)

(73) Assignee: Reservoir Labs, Inc., San Diego, CA (US)

( * ) Notice: Subject to any disclaimer, the term of this patent is extended or adjusted under 35 U.S.C. 154(b) by 212 days.

(21) Appl. No.: 17/181,862

(22) Filed: Feb. 22, 2021

Related U.S. Application Data

(60) Provisional application No. 63/013,183, filed on Apr. 21, 2020.

(51) Int. Cl.
 *H04L 47/12* (2022.01)
 *H04L 43/045* (2022.01)
 *H04L 43/0882* (2022.01)

(52) U.S. Cl.
 CPC ............ *H04L 47/12* (2013.01); *H04L 43/045* (2013.01); *H04L 43/0882* (2013.01)

(58) Field of Classification Search
 None
 See application file for complete search history.

(56) References Cited

U.S. PATENT DOCUMENTS

| | | | | |
|---|---|---|---|---|
| 7,310,793 B1* | 12/2007 | Teig | ...................... | H01L 23/528 257/774 |
| 2002/0161914 A1* | 10/2002 | Belenki | ................... | H04L 47/15 709/233 |
| 2009/0279434 A1* | 11/2009 | Aghvami | ............ | H04L 47/2475 370/235 |
| 2013/0311643 A1* | 11/2013 | Kulkarni | ............. | H04L 43/0852 709/224 |
| 2015/0295827 A1* | 10/2015 | Zhu | ......................... | H04L 65/80 370/230 |
| 2015/0365325 A1* | 12/2015 | Hwang | ................... | H04L 47/12 370/230 |
| 2016/0087899 A1* | 3/2016 | Katevenis | ............... | H04L 47/22 370/230 |
| 2017/0127463 A1* | 5/2017 | Narasimha | .............. | H04L 47/32 |
| 2018/0349198 A1* | 12/2018 | Sun | ........................ | G06F 9/5061 |
| 2019/0238468 A1* | 8/2019 | Kadel | ................. | H04L 43/0852 |

* cited by examiner

*Primary Examiner* — Jason E Mattis
*Assistant Examiner* — Bao G Nguyen
(74) *Attorney, Agent, or Firm* — Seyfarth Shaw LLP

(57) ABSTRACT

A technique is described for quantifying the effect of a perturbation on a property of a network link or flow, and to manipulate the network based on a quantitative estimation of the perturbation.

18 Claims, 27 Drawing Sheets
(19 of 27 Drawing Sheet(s) Filed in Color)

Algorithm 1A GradientGraph

Input: $\mathcal{N} = (\mathcal{L}, \mathcal{F}, \{c_l, \forall l \in \mathcal{L}\})$;

1: $\mathcal{L}^0 = \mathcal{L}; \mathcal{C}^0 = \{\emptyset\}; k = 0;$
2: $E = \{\emptyset\};$
3: while $\mathcal{C}^k \neq \mathcal{F}$ do
4:     $s_l^k = (c_l - \sum_{\forall f \in \mathcal{C}^k \cap \mathcal{F}_l} r_f) / |\mathcal{F}_l \setminus \mathcal{C}^k|, \forall l \in \mathcal{L}^k;$
5:     $u_l^k = \min\{s_{l'}^k \mid \mathcal{F}_{l'} \cap \mathcal{F}_l \neq \{\emptyset\}, \forall l' \in \mathcal{L}^k\}, \forall l \in \mathcal{L}^k;$
6:     for $l \in \mathcal{L}^k, s_l^k = u_l^k$ do
7:       $r_f = s_l^k, \forall f \in \mathcal{F}_l \setminus \mathcal{C}^k;$
8:       $E = E \cup \{(l, f), \forall f \in \mathcal{F}_l \setminus \mathcal{C}^k\};$
9:       $E = E \cup \{(f, l'), \forall f \in \mathcal{F}_l \setminus \mathcal{C}^k \text{ and } \forall l' \in \mathcal{L}_f \mid s_{l'}^k \neq u_{l'}^k\};$
10:       $\mathcal{L}^k = \mathcal{L}^k \setminus \{l\};$
11:       $\mathcal{C}^k = \mathcal{C}^k \cup \{f, \forall f \in \mathcal{F}_l\};$
12:    end for
13:    $\mathcal{L}^{k+1} = \mathcal{L}^k; \mathcal{C}^{k+1} = \mathcal{C}^k;$
14:    $k = k + 1;$
15: end while
16: $\mathcal{V} = \mathcal{L} \setminus \mathcal{L}^k \cup \mathcal{F}; s_l = s_l^k, \forall l \in \mathcal{B};$
17: $\mathcal{G} = (\mathcal{V}, E);$
18: return $(\mathcal{G}, \{s_l, \forall l \in \mathcal{L}\}, \{r_f, \forall f \in \mathcal{F}\});$

FIG. 1A

Algorithm 1B GradientGraph($\mathcal{N} = \langle \mathcal{L}, \mathcal{F}, \{c_l, \forall l \in \mathcal{L}\} \rangle$)

1: $\mathcal{V} = \emptyset; E = \emptyset; r_f = \infty, \forall f \in \mathcal{F};$
2: for $l \in \mathcal{L}$ do
3:    $a_l = c_l;$    # available capacity
4:    $s_l = a_l/|\mathcal{F}_l|;$    # fair share
5:    MinHeapAdd(key = $s_l$, value= $l$);
6: end for
7: while $\mathcal{F} \not\subseteq \mathcal{V}$ do
8:    $l =$ MinHeapPop();
9:    for $f \in \mathcal{F}_l$ such that $r_f \geq s_l$ do
10:      $E = E \cup \{(l, f), (f, l)\};$
11:      if $f \notin \mathcal{V}$ then
12:        $r_f = s_l;$
13:        $\mathcal{V} = \mathcal{V} \cup \{f\};$
14:        for $l' \in \mathcal{L}_f$ such that $r_f < s_{l'}$ do
15:          $E = E \cup \{(f, l')\}$
16:          $a_{l'} = a_{l'} - s_l$
17:          $s_{l'} = a_{l'}/|\mathcal{F}_{l'} \setminus \mathcal{V}|;$
18:          MinHeapUpdateKey(value = $l'$, newKey = $s_{l'}$);
19:        end for
20:      end if
21:    end for
22:    $\mathcal{V} = \mathcal{V} \cup \{l\};$
23: end while
24: return $\langle \mathcal{G} = (V, E), \{s_l, \forall l \in \mathcal{L}\}, \{r_f, \forall f \in \mathcal{F}\} \rangle;$

FIG. 1B

Algorithm 2 LeapFold

Input: $\mathcal{N} = \langle \mathcal{L}, \mathcal{F}, \{c_l, \forall l \in \mathcal{L}\}\rangle; x \in \mathcal{L} \cup \mathcal{F};$
1: $\langle \mathcal{G}, \{s_l, \forall l \in \mathcal{L}\}, \{r_f, \forall f \in \mathcal{F}\}\rangle = GradientGraph(\mathcal{N});$
2: $leap = \infty;$
3: for $l \in \mathcal{L}$ do
4:    for $l' \in LinkSuccessors(\mathcal{G}, l)$ do
5:       $\lambda = (s_l - s'_l)/(\nabla_x(l') - \nabla_x(l));$
6:       if $\lambda < leap$ then
7:          $leap = \lambda;$
8:          $fold = (l, l');$
9:       end if
10:    end for
11: end for
12: return $\langle leap, fold \rangle;$

FIG. 3

Algorithm 3 MinimizeFCT

Input: $\mathcal{N} = \langle \mathcal{L}, \mathcal{F}, \{c_l, \forall l \in \mathcal{L}\}\rangle; f_s \in F; \rho;$
1: while True do
2:    $f^* = \arg\max_{f \in F} \nabla_f(f_s);$
3:    if $\nabla_{f^*}(f_s) \leq 0$ or $r_s \geq \rho$ then
4:       return $\langle \mathcal{L}, \mathcal{F} \rangle;$
5:    end if
6:    $\langle \mathcal{G}, \{s_l, \forall l \in \mathcal{L}\}, \{r_f, \forall f \in \mathcal{F}\}\rangle = GradientGraph(\mathcal{N});$
7:    $\langle fold, leap \rangle = LeapFold(\mathcal{L}, \mathcal{F}, f^*);$
8:    $k = |\mathcal{L}| + 1;$
9:    $\mathcal{L} = \mathcal{L} \cup \{l_k\};$   # Add the traffic shaper to the network
10:    $f^* = f^* \cup \{l_k\};$   # Ensure flow $f^*$ traverses the traffic shaper
11:    $c_k = r_{f^*} - leap;$ # Set the traffic shaper rate
12: end while
13: return $\langle \mathcal{L}, \mathcal{F} \rangle;$

FIG. 4

Tapering parameter $\tau = 4/3$

Tapering parameter $\tau = 1$

Tapering parameter τ = 4/3.

Tapering parameter τ = 1.

NETWORK ANALYSIS AND MANAGEMENT BASED ON A QUANTITATIVE THEORY OF BOTTLENECK STRUCTURES

CROSS-REFERENCE TO RELATED APPLICATIONS

This application claims priority to and benefit of U.S. Provisional Patent Application No. 63/013,183, titled "Systems And Methods For Identifying Bottlenecks In Data Networks," filed on Apr. 21, 2020, the entire contents of which are incorporated herein by reference.

GOVERNMENT LICENSE RIGHTS

This invention was made with government support under Contract No. DE-SC0019523 awarded by the U.S. Department of Energy (DoE). The government has certain rights in the invention.

FIELD

This disclosure generally relates to networking systems and, in particular, to analysis of perturbation of links and/or flows in a network, and to network manipulation.

BACKGROUND

The problem of congestion control is one of the most widely studied areas in data networks. Many congestion control algorithms, including the BBR algorithm recently proposed by Google, are known. The conventional view of the problem of congestion control in data networks has focused around the principle that a flow's performance is uniquely determined by the state of its bottleneck link. This view helped the Internet recover from congestion collapse in 1988, and throughout the more than 30 years of research and development that followed. A well-known example of the traditional single-bottleneck view is the Mathis equation, which can model the performance of a single TCP flow based on the equation $$\frac{MSS}{RTT \cdot \sqrt{p}},$$

where MSS is the maximum segment size, RTT is the round trip time of the flow and p is the packet loss probability.

SUMMARY

Bottleneck links in congestion-controlled networks do not operate as independent resources, however. For instance, Mathis equation does not take into account the system-wide properties of a network, including its topology, the routing and the interactions between flows. In reality, bottleneck links generaly operate according to a bottleneck structure described herein that can reveal the interactions of bottleneck links, and the system-wide ripple effects caused by perturbations in the network. Techniques using the bottleneck structure, such as the GradientGraph method described below, can adresses a gap in the analysis performed by the conventional techniques, and can provide an alternative methodology to estimate network flow throughput.

Specifically, we present a quantitative technique for expressing bottleneck structures, a mathematical and engineering framework based on a family of polynomial-time algorithms that can be used to reason and identify optimized solutions in a wide variety of networking problems, including network design, capacity planning, flow control and routing. For each of these applications, we present examples and experiments to demonstrate how bottleneck structures can be practically used to design and optimize data networks.

Accordingly, in one aspect a method is provided for analyzing/managing network flows. The method includes, performing by a processor, for a network having several links and several active during a specified time window, constructing a gradient graph. The gradient graph includes one or more link vertices respectively corresponding to one or more links and one or more flow vertices respectively corresponding to one or more flows. The gradient graph also includes one or more link-to-flow edges from a link vertex to one or more flow vertices, where the link-to-flow edges indicate that respective flows corresponding to the one or more flow vertices are bottlenecked at a link corresponding to the link vertex. The method also includes computing and storing, for each link vertex, a respective fair share of a corresponding link.

In some embodiments, the gradient graph includes one or more flow-to-link edges from a flow vertex to one or more link vertices, where a flow corresponding to the flow vertex traverses respective links corresponding to the respective link vertices, but that flow is not bottlenecked at the respective links. In other embodiments, the flow is bottlenecked at at least one of the network links and, as such, at least one of the one or more link-to-flow edges is or includes a bidirectional edge.

Constructing the gradient graph may include determining, for each link in the network, a number of flows bottlenecked at that link, and summing, over the plurality of links, the respective numbers of flows bottlenecked at each link, to obtain a total number of link-to-flow edges in the gradient graph. The method may further include allocating memory based on, at least in part, the total number of link-to-flow edges for the gradient graph. The overall memory allocation may additionally depend, at least in part, on the total number of link vertices, the total number of flow vertices, and the total number of flow-to-link edges. Since, for one or more links, all flows traversing such links may not be bottlenecked at those respective links, the total number of link-to-flow edges (or the total number of bidirectional link-to-flow edges) that are required may be minimized compared to a network graph structure having, for each link, and edge from a corresponding link vertex to vertices corresponding to all flows traversing the link. This can facilitate a memory efficient storage of the gradient graph.

In some embodiments, the method further includes selecting, from the plurality of flows, a flow to be accelerated and determining, by traversing the gradient graph, a target flow associated with a positive flow gradient. In addition, the method may include computing a leap and a fold for the target flow, where the fold includes at least two links having the same or substantially the same faire share. The method may also include reducing flow rate of the target flow using a traffic shaper by a factor up to the leap, and increasing flow rate of the flow to be accelerated up to up to a product of the leap and a gradient of the flow to be accelerated. The factor may be selected to preserve completion time of slowest of the flows in the network. The method may include repeating the determining, computing, reducing, and increasing steps.

The gradient graph may include several levels, including a first level of link vertices and a second, lower level of link vertices, where the flows associated with (e.g., bottlenecked at) the lower level of link vertices may generally have higher rates. The method may include, for adding a new flow to the network, designating the new flow to at least one link of the second level, regardless of whether that link is a part of the shortest path for the flow to be added, to improve flow performance.

The method may include selecting, from the links in the network, a link for which capacity is to be increased, computing a leap of a gradient of the selected link, and increasing capacity of the selected link by up to the leap, to improve network performance. The network may include a data network, a transportation network, an energy distribution network, a fluidic network, or a biological network.

In another aspect, a system is provided for analyzing/managing network flows. The system includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to: for a network having several links and several active during a specified time window, constructing a gradient graph.

The gradient graph includes one or more link vertices respectively corresponding to one or more links and one or more flow vertices respectively corresponding to one or more flows. The gradient graph also includes one or more link-to-flow edges from a link vertex to one or more flow vertices, where the link-to-flow edges indicate that respective flows corresponding to the one or more flow vertices are bottlenecked at a link corresponding to the link vertex. The instructions also configure the processing unit to compute and store, for each link vertex, a respective fair share of a corresponding link. In various embodiments, the instructions can program the processing unit to perform one or more of the method steps described above.

In another aspect, a method is provided for analyzing/managing a network. The method includes performing by a processor the steps of: obtaining network information and determining a bottleneck structure of the network, where the network includes several links and several flows. The method also includes determining propagation of a perturbation of a first flow or link using the bottleneck structure, and adjusting the first flow or link, where the adjustment results in a change in a second flow or link, where the change is based on the propagation of the perturbation or the adjustment to the first flow or link.

The network may include a data network, a transportation network, an energy distribution network, a fluidic network, or a biological network. Determining the propagation may include computing a leap and a fold associated with the first flow or link, and adjusting the first flow or link may include increasing or decreasing a rate of the first flow or increasing or decreasing allotted capacity of the first link.

In another aspect, a system is provided for analyzing/managing a network. The system includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to: obtain network information and determine a bottleneck structure of the network, where the network includes several links and several flows.

The instructions also program the processing unit to determine propagation of a perturbation of a first flow or link using the bottleneck structure, and to adjust or direct adjusting of the first flow or link, where the adjustment results in a change in a second flow or link, and where the change is based on the propagation of the perturbation or the adjustment to the first flow or link. In various embodiments, the instructions can program the processing unit to perform one or more of the method steps described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention.

In the drawings:

FIGS. 1A and 1B show different embodiments of a procedure to construct a gradient graph used in analysis and manipulation of a network;

FIGS. 2A and 2B illustrate analysis of bottleneck links and bottleneck flows, according to various embodiments;

FIGS. 2C and 2D illustrate computation of gradients for the links and flows depicted in FIGS. 2A and 2B, according to various embodiments;

Figure 5:
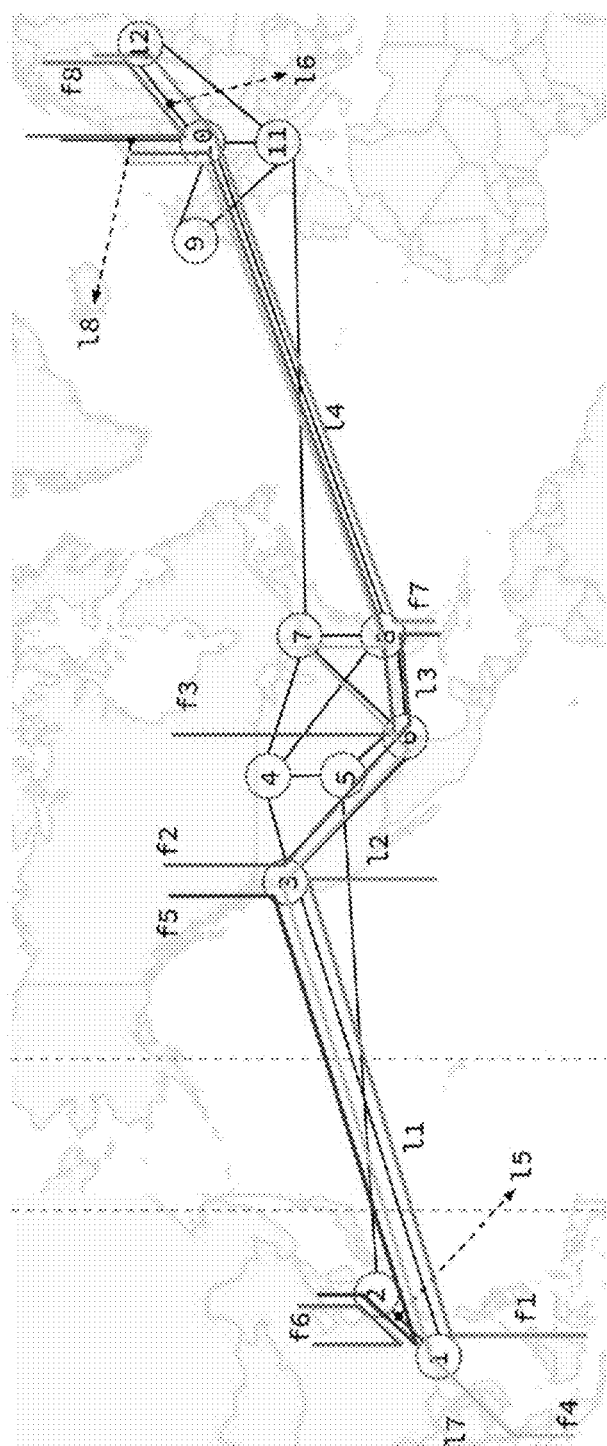
Figures 6A, 6B:
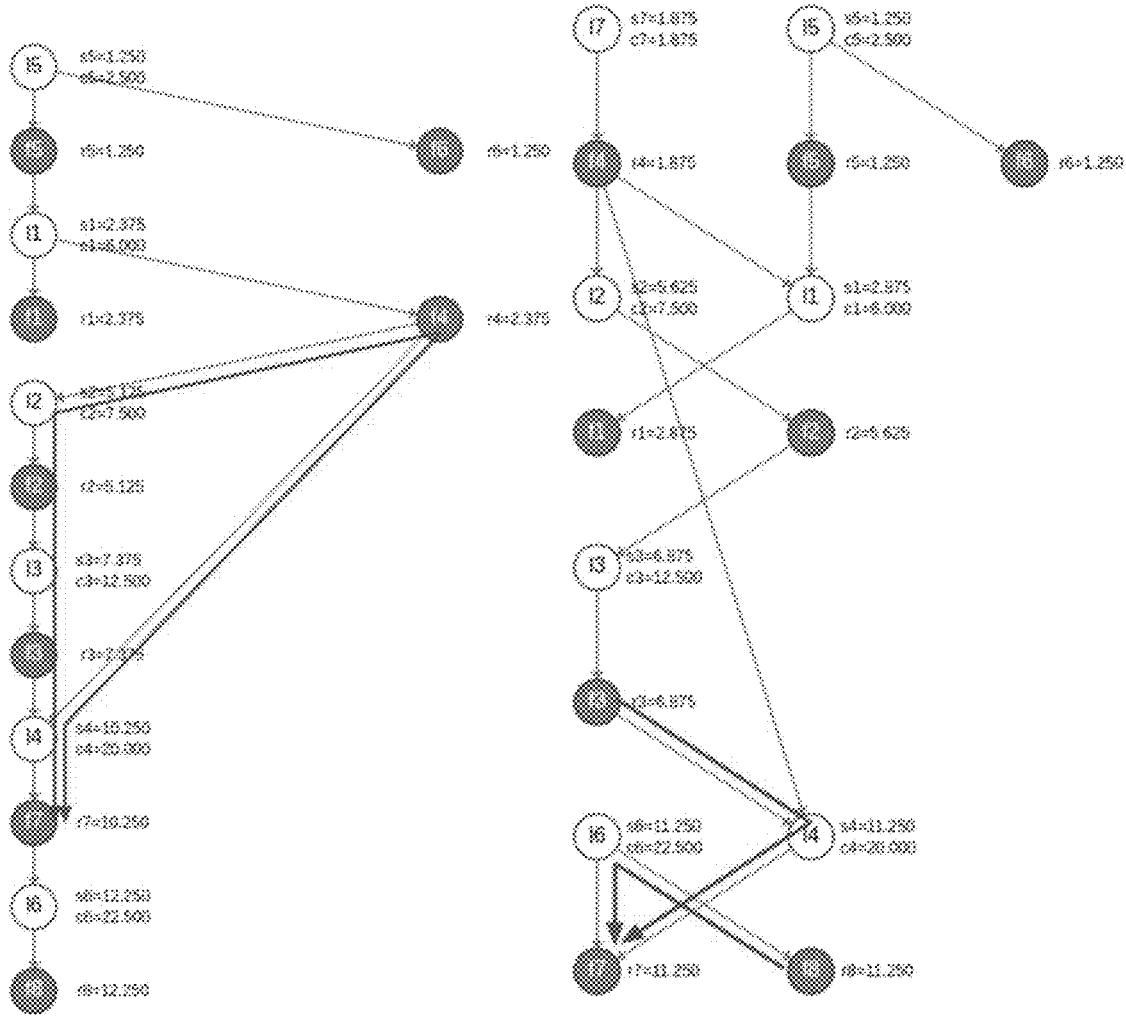
Figure 6C:
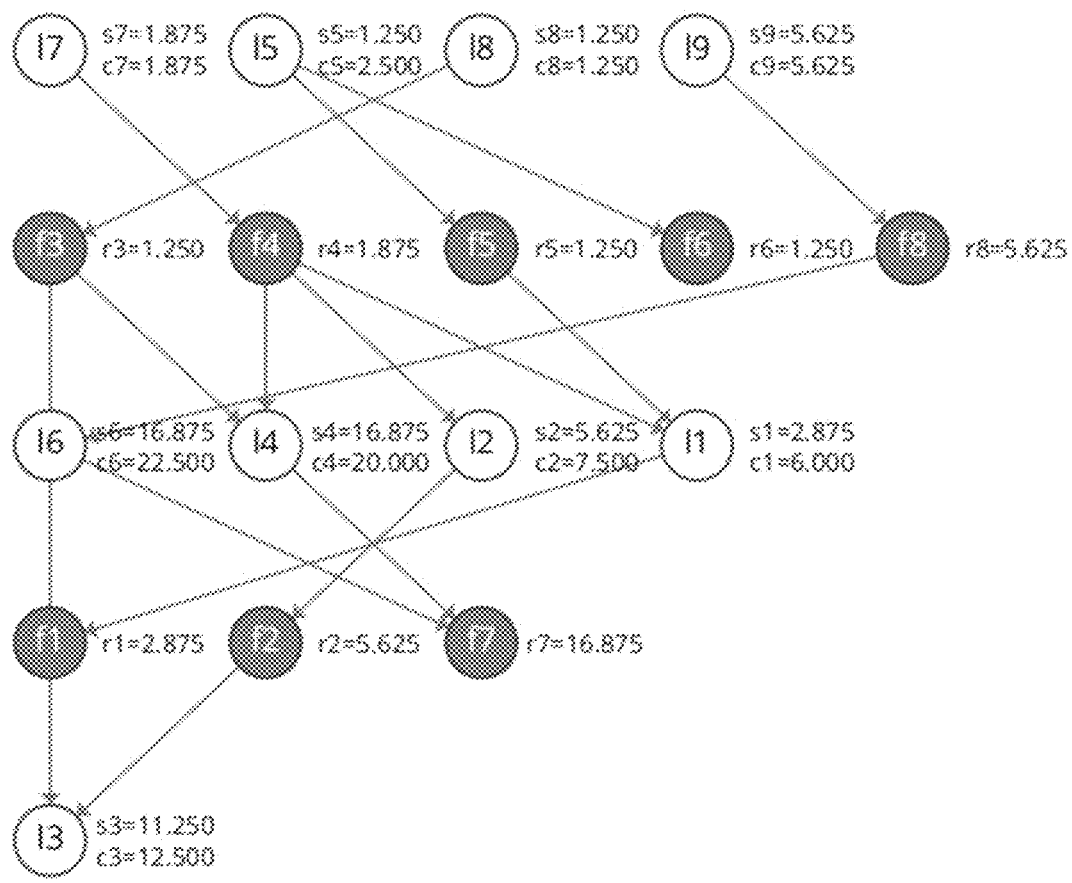
Figure 7:
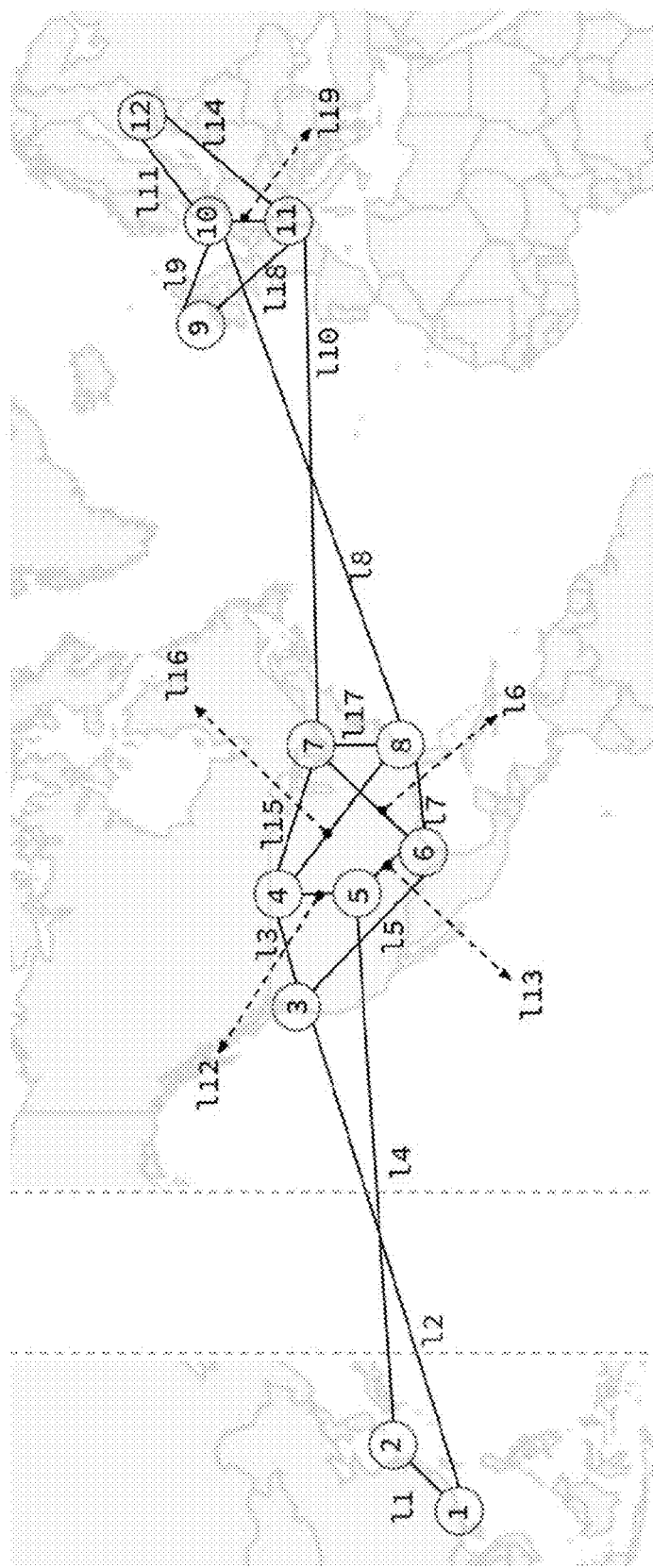
Figure 8A:
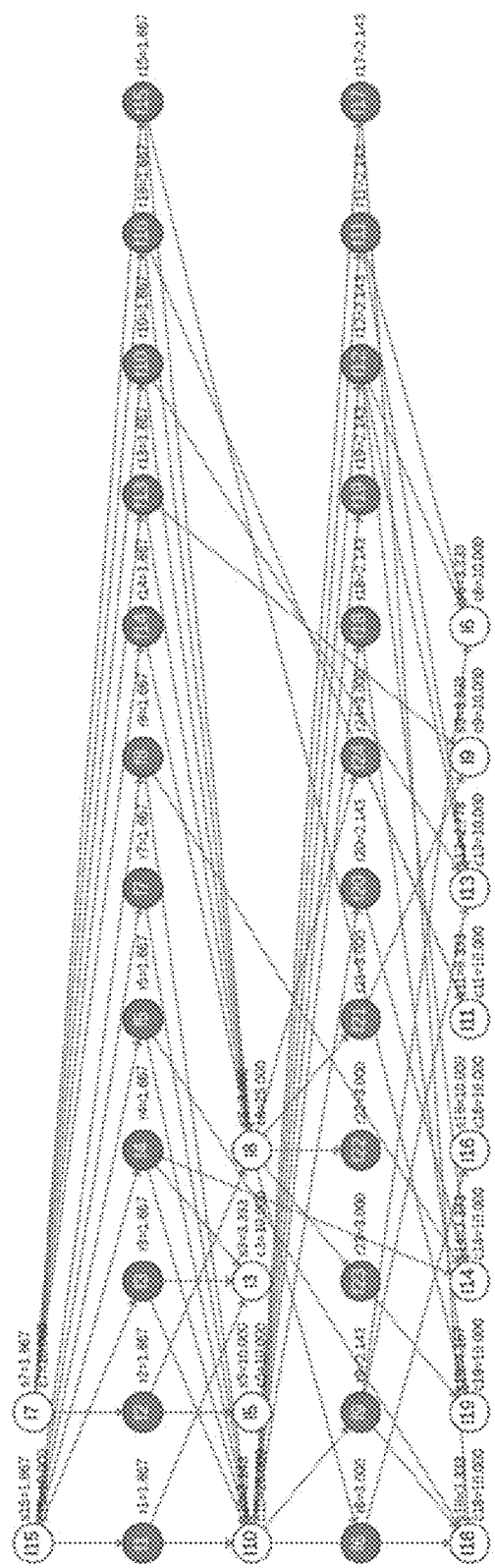
Figure 8B:
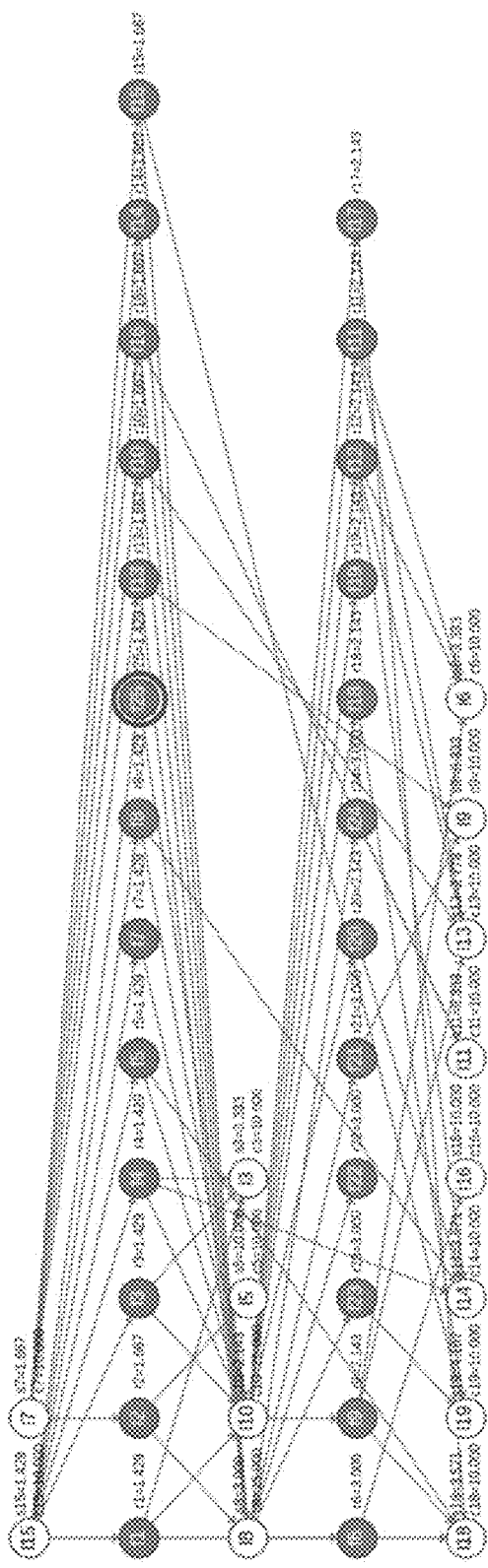
Figure 8C:
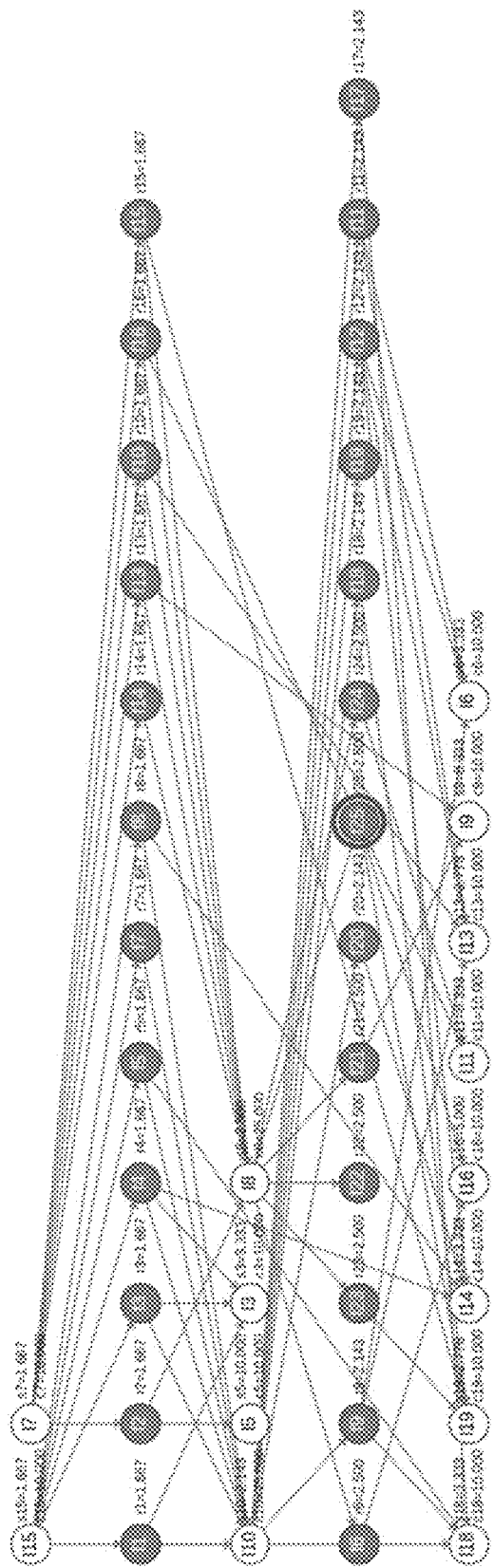
Figure 9:
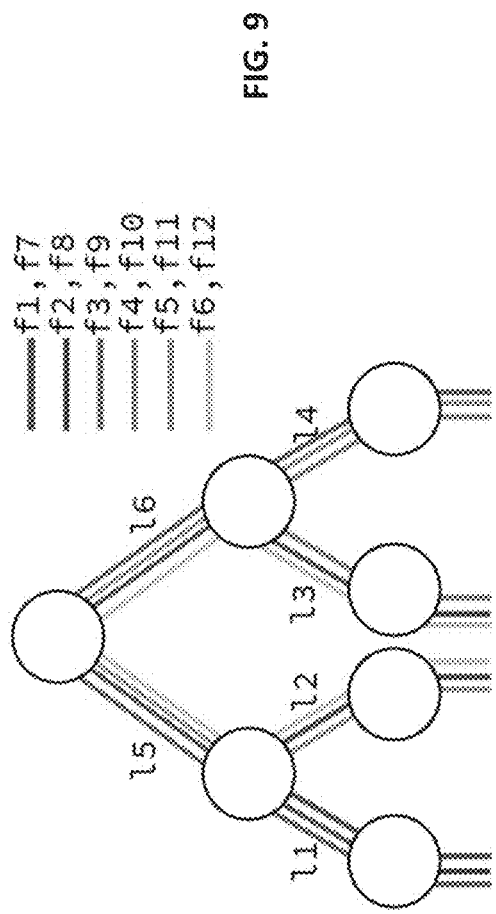
Figure 10A:
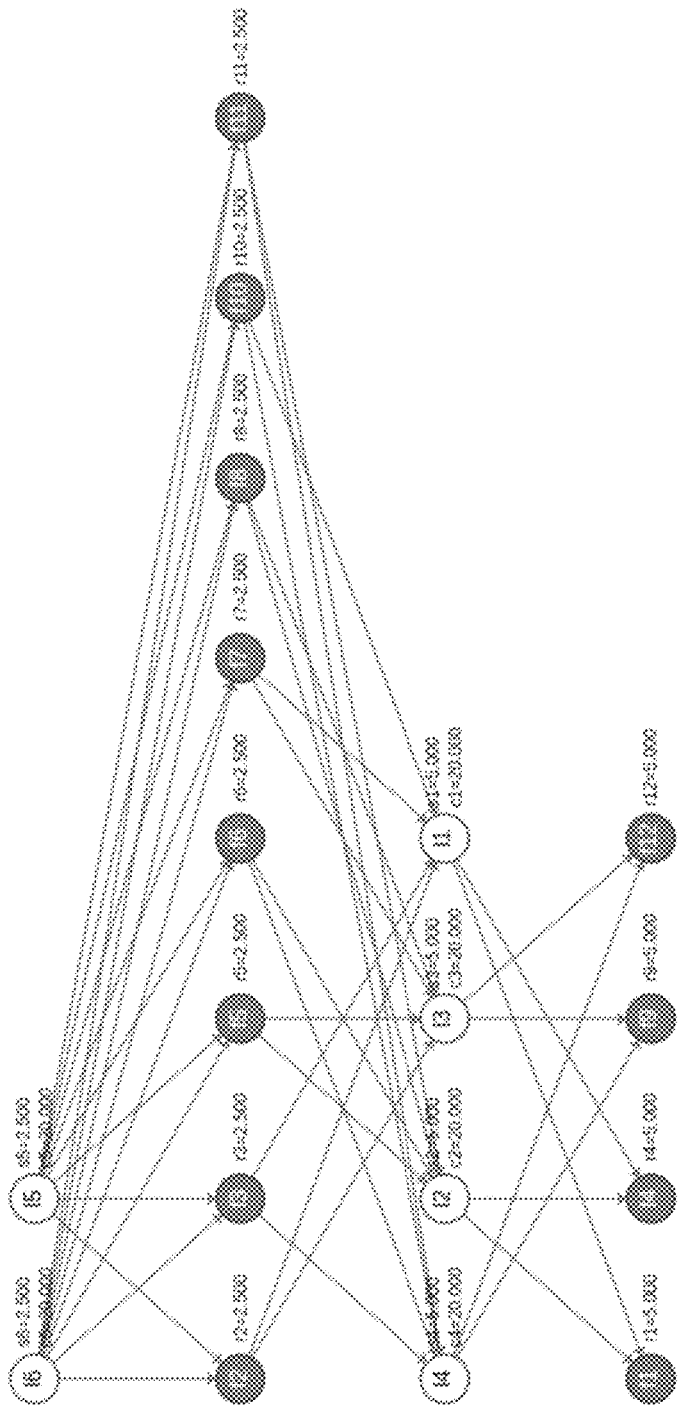
Figure 10B:
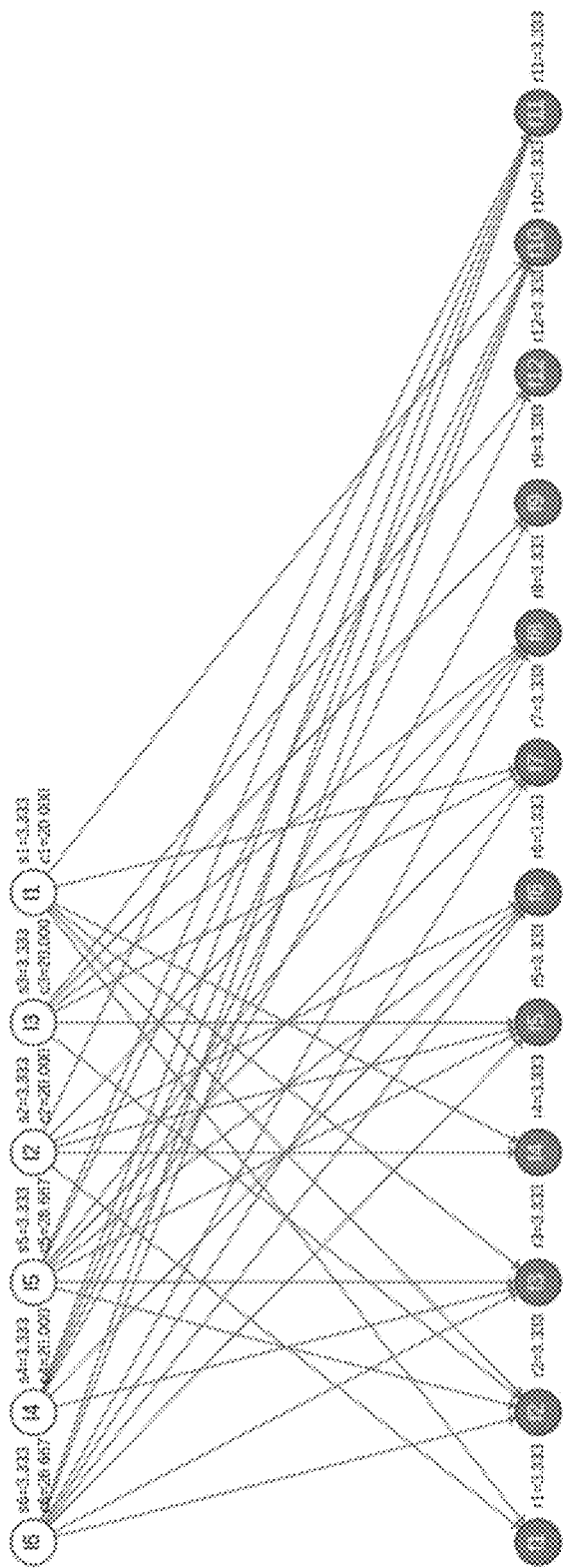
Figure 10C:
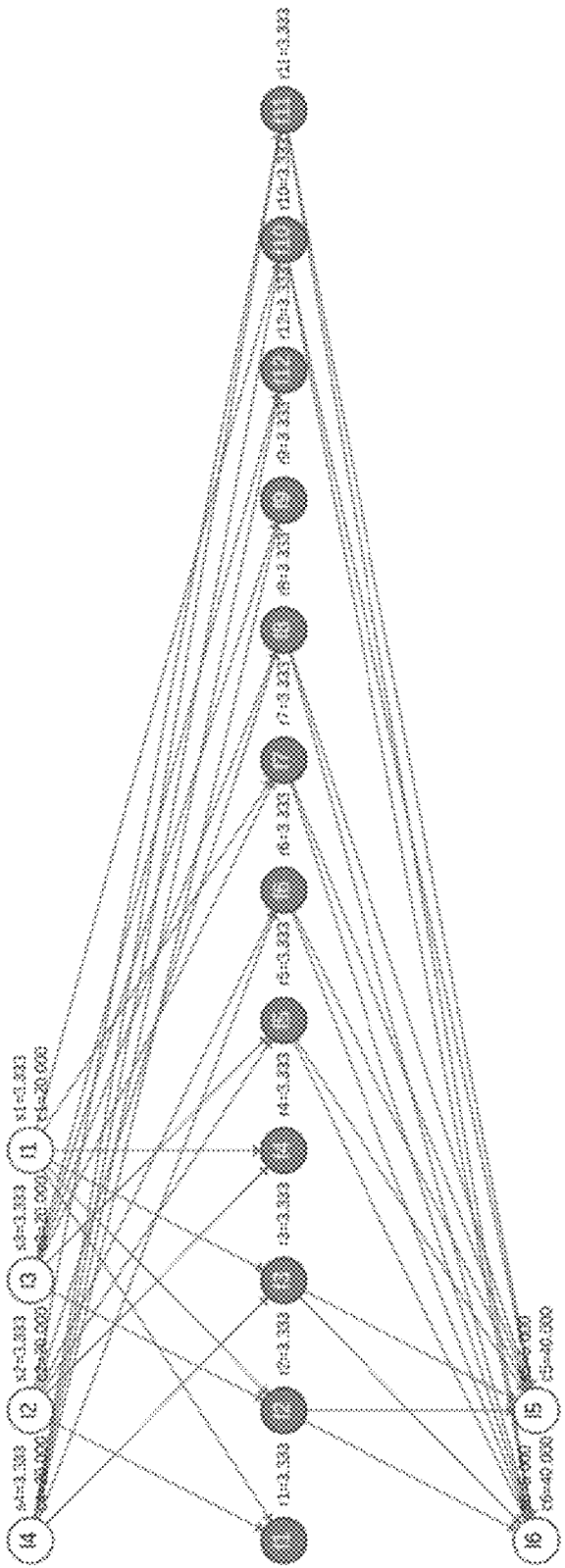
Figure 11A:
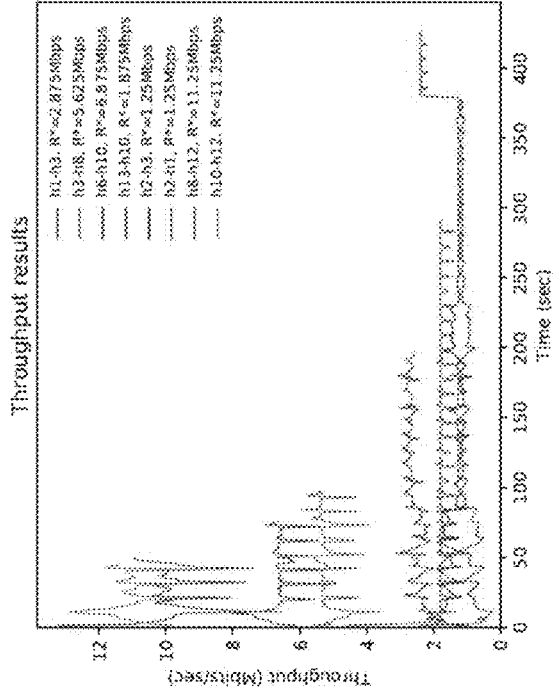
Figure 11B:
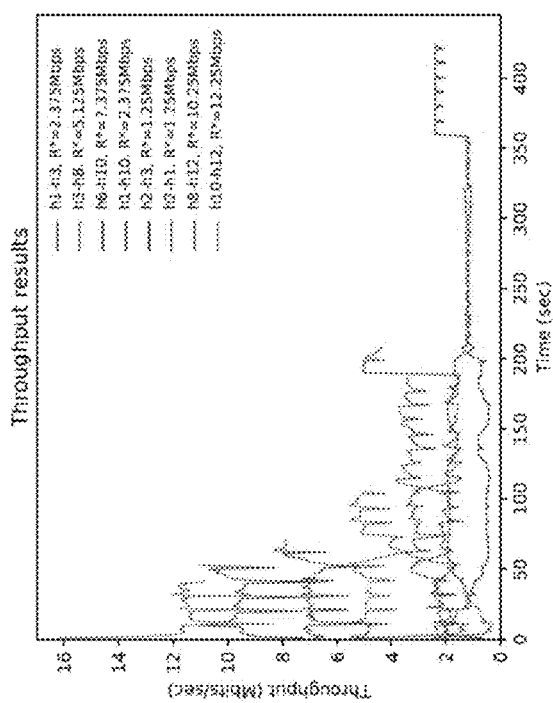
Figure 11C:
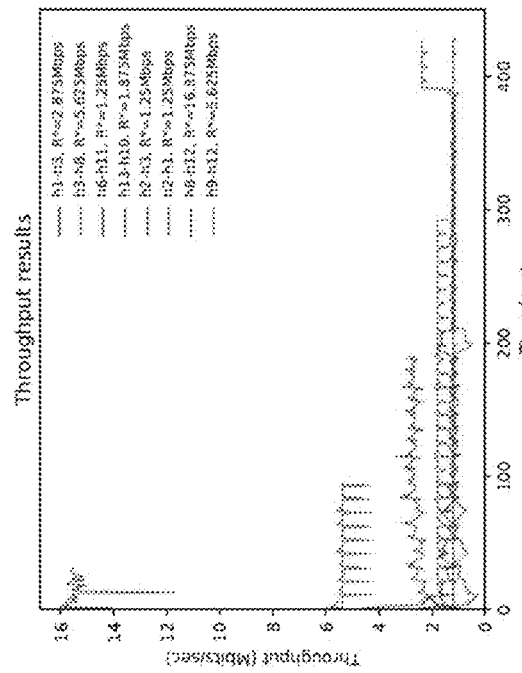
Figure 11D:
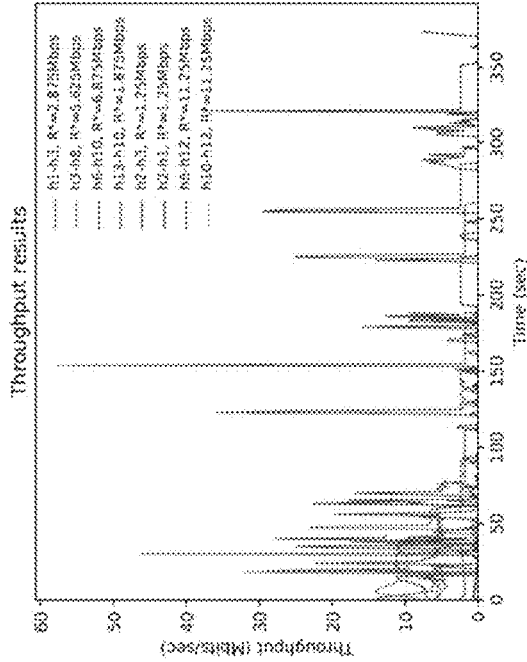
Figure 11E:
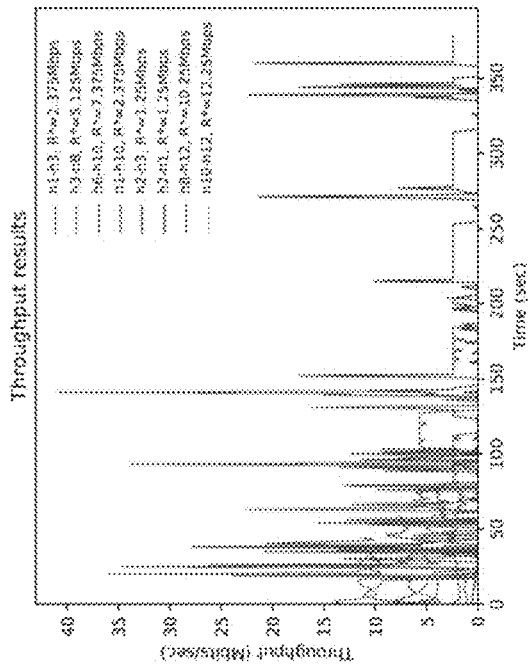
Figure 11F:
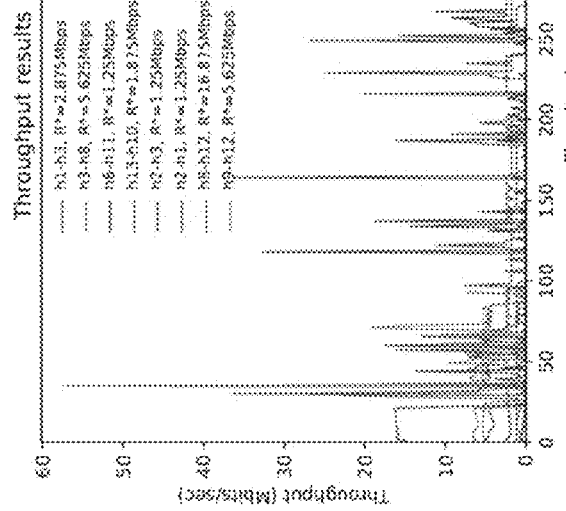
Figure 12A:
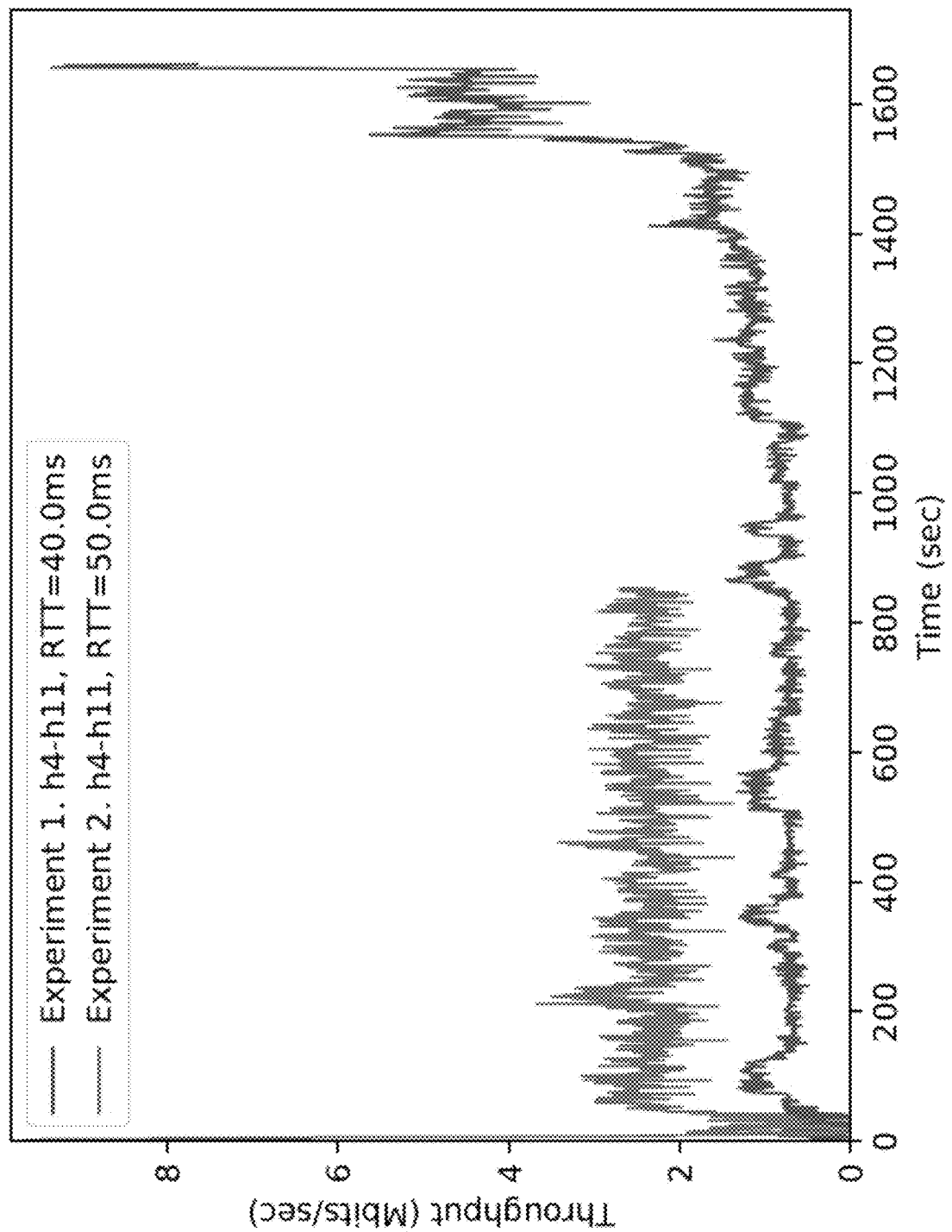
Figure 12B:
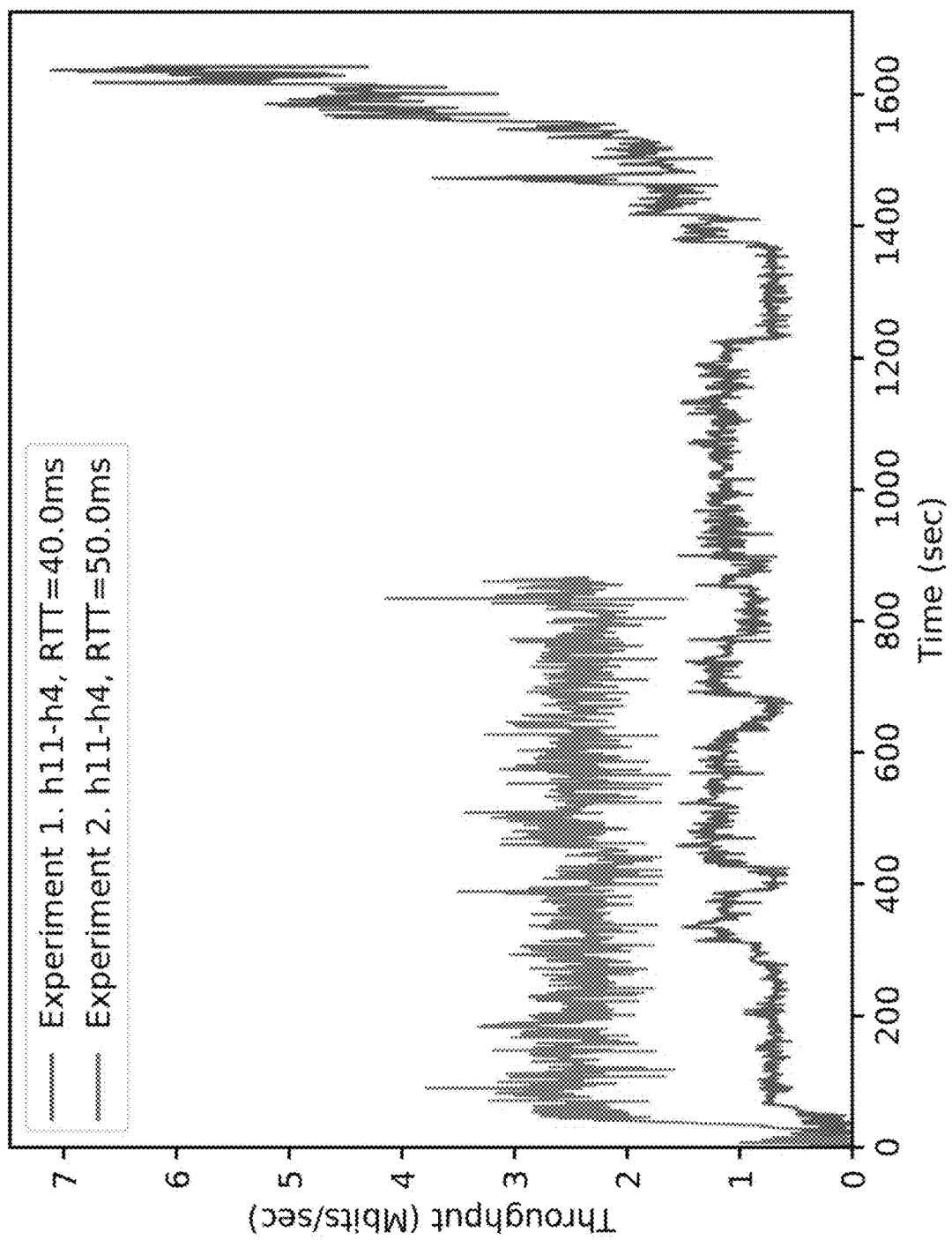
Figure 13B:
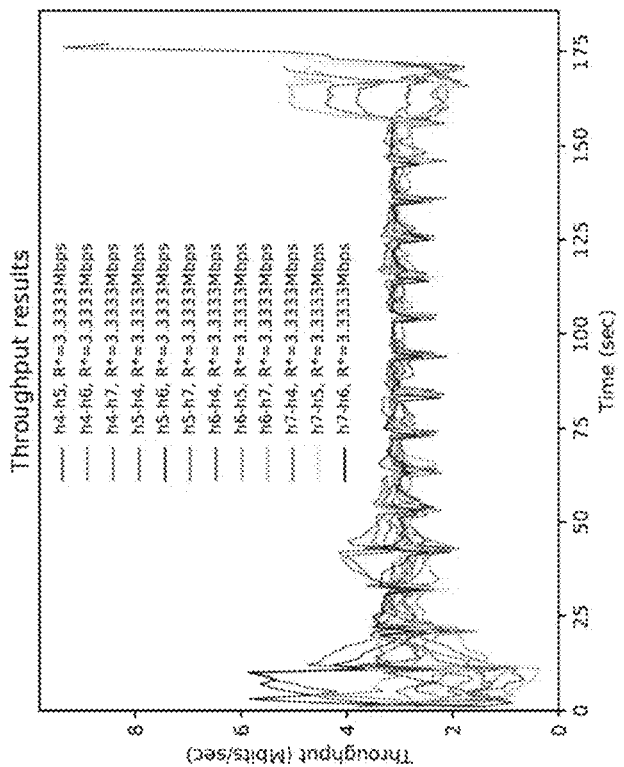
Figure 13A:
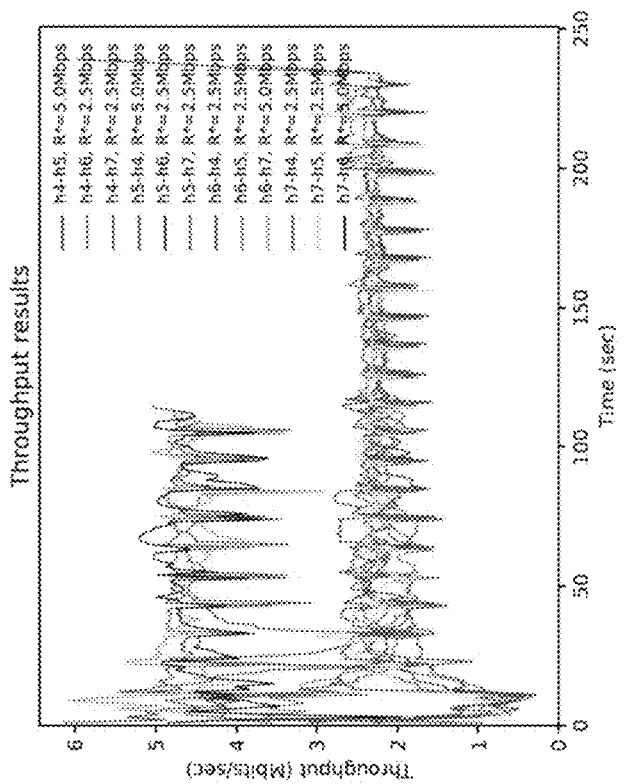
Figure 13C:
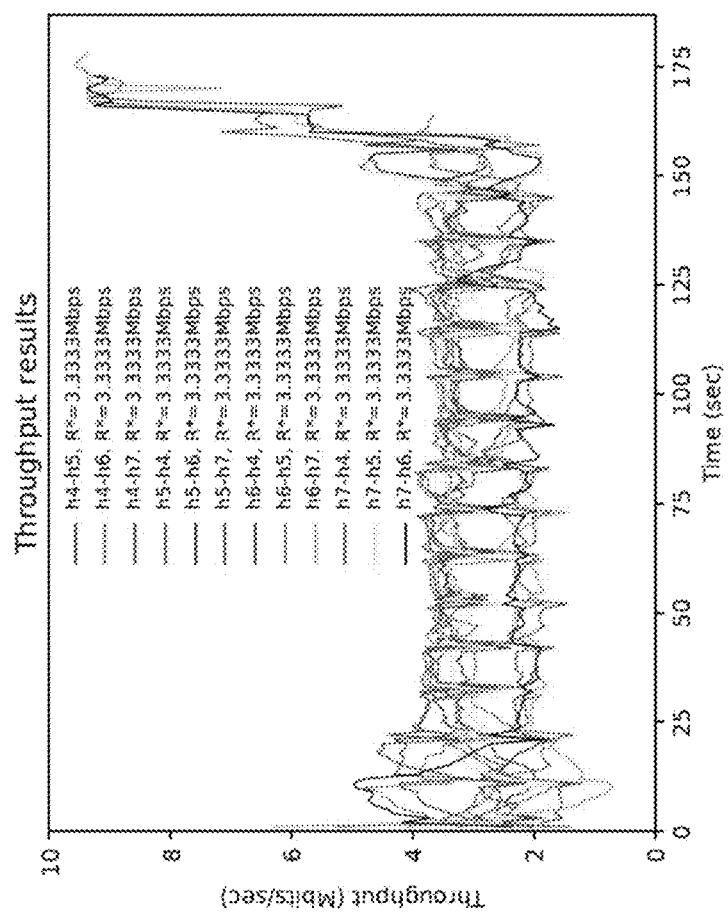
Figure 13E:
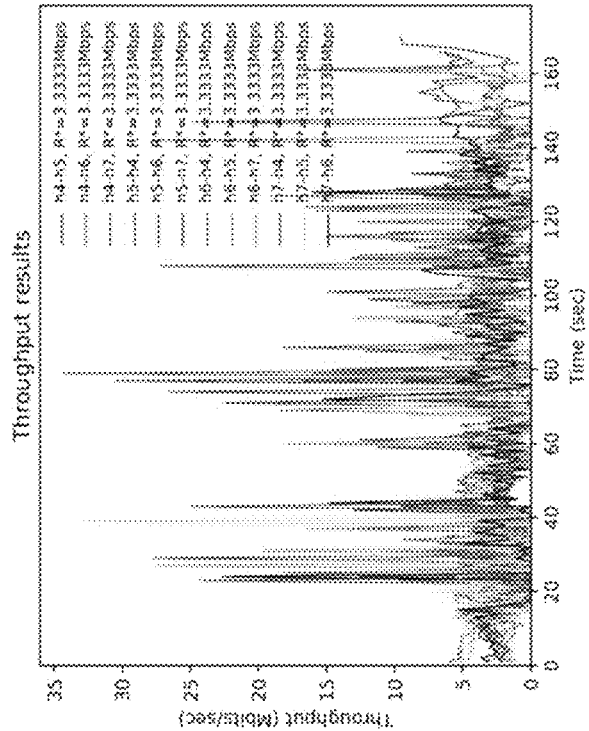
Figure 13D:
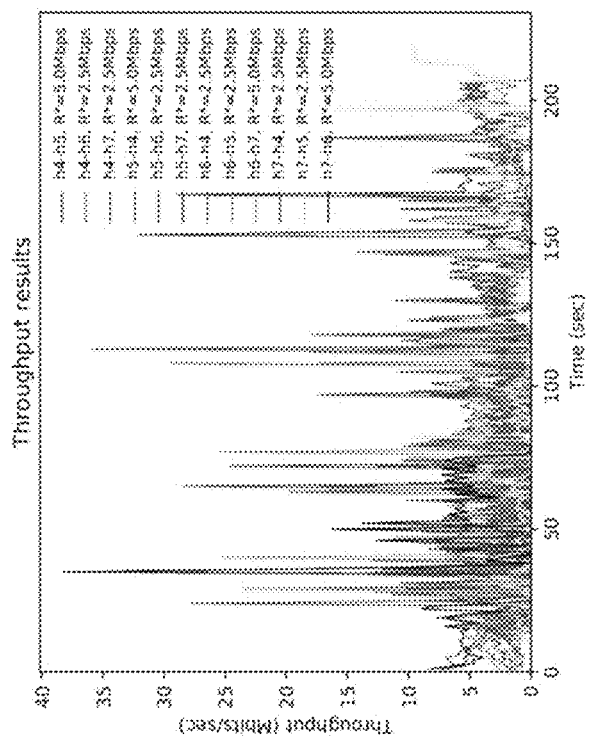
Figure 13F:
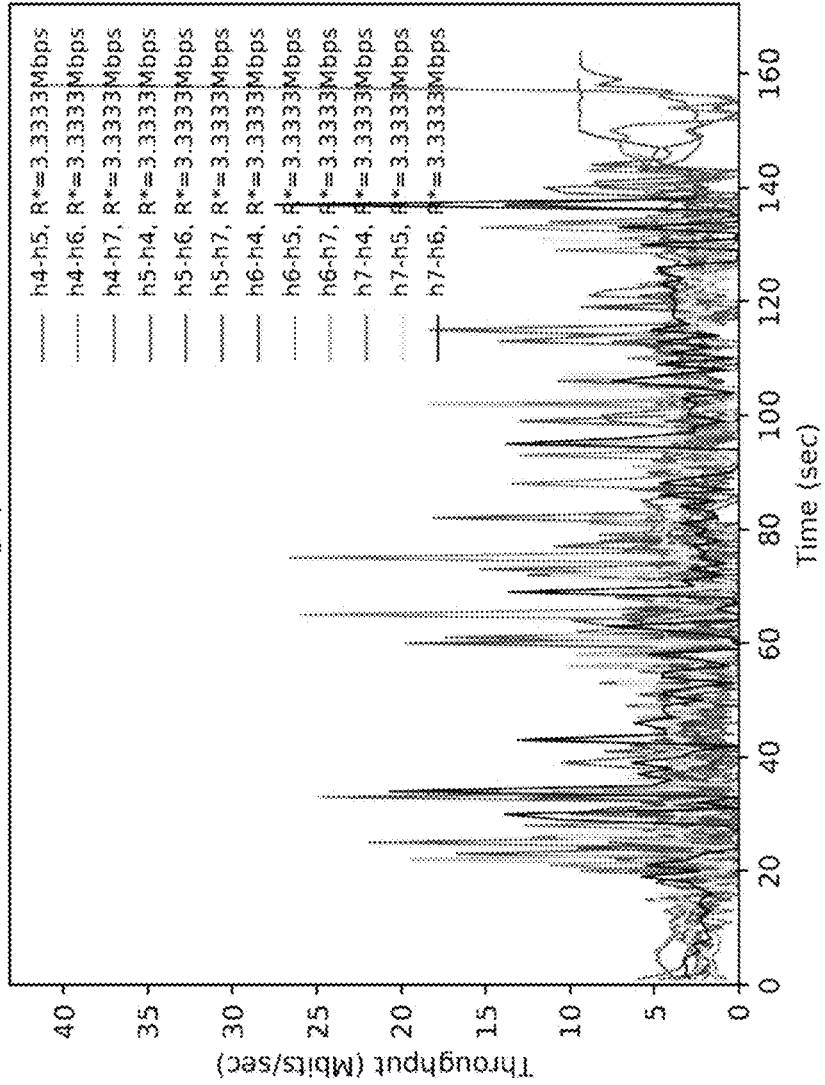
Figure 14:
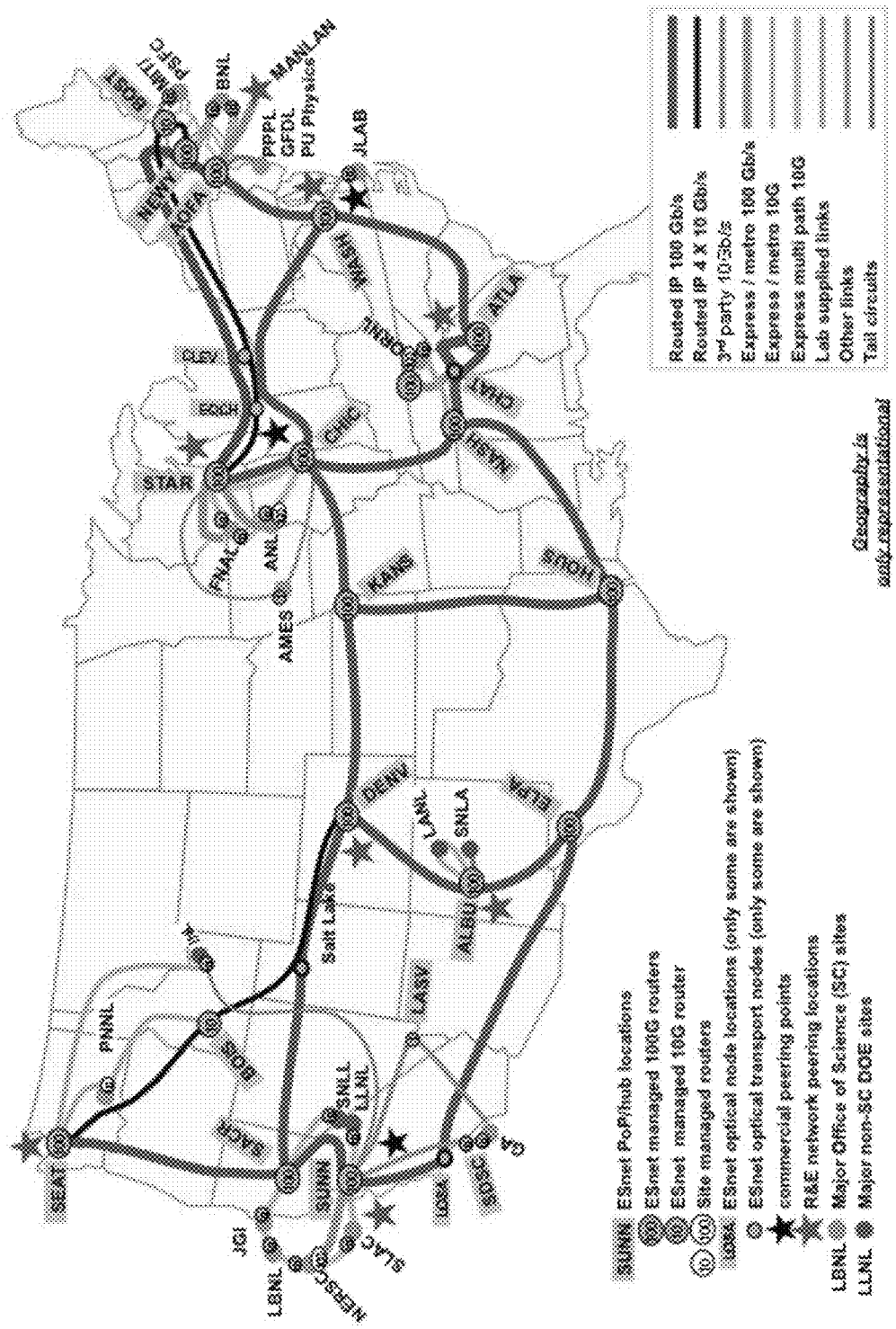
Figure 15:
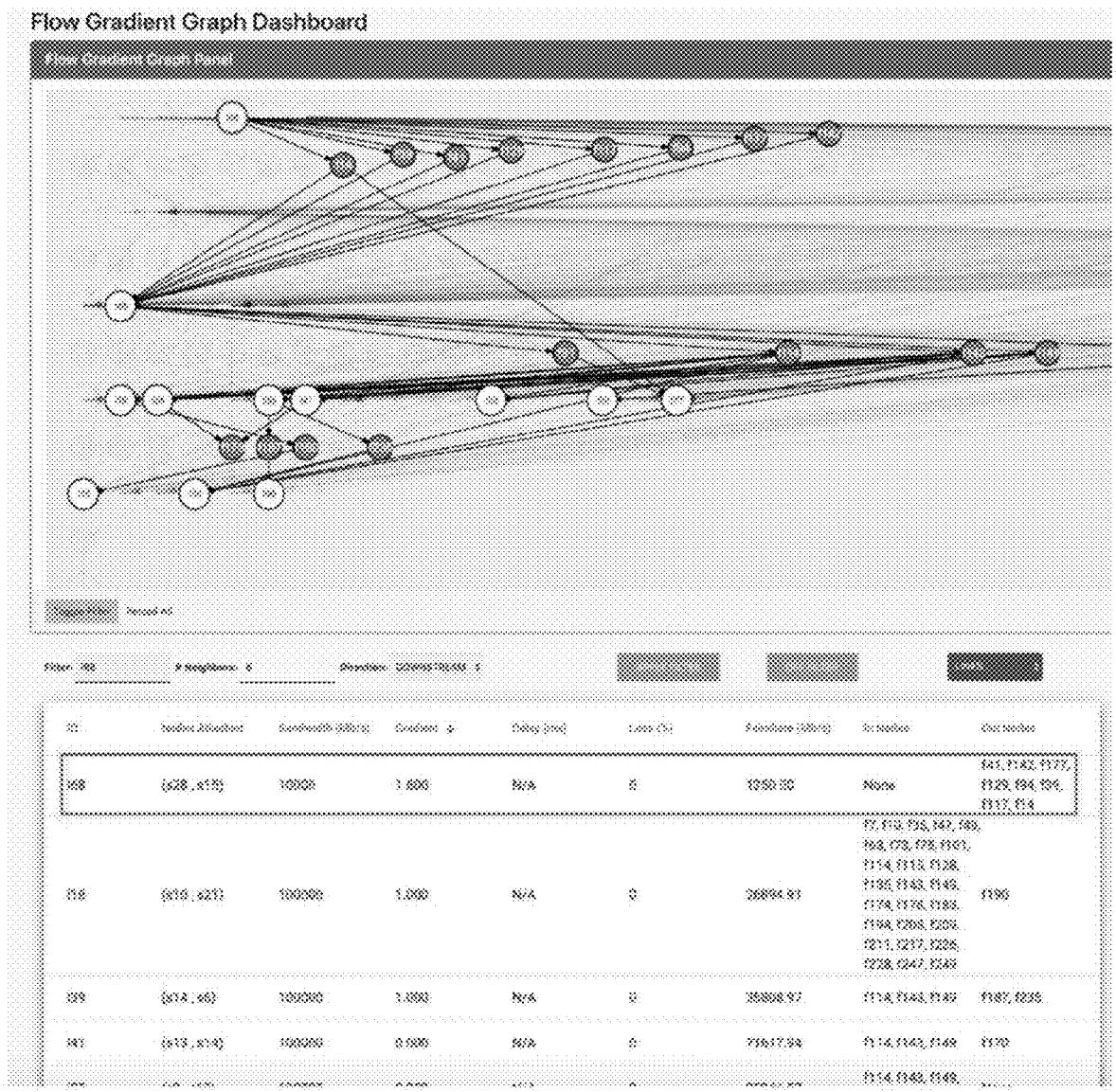
Figure 16:
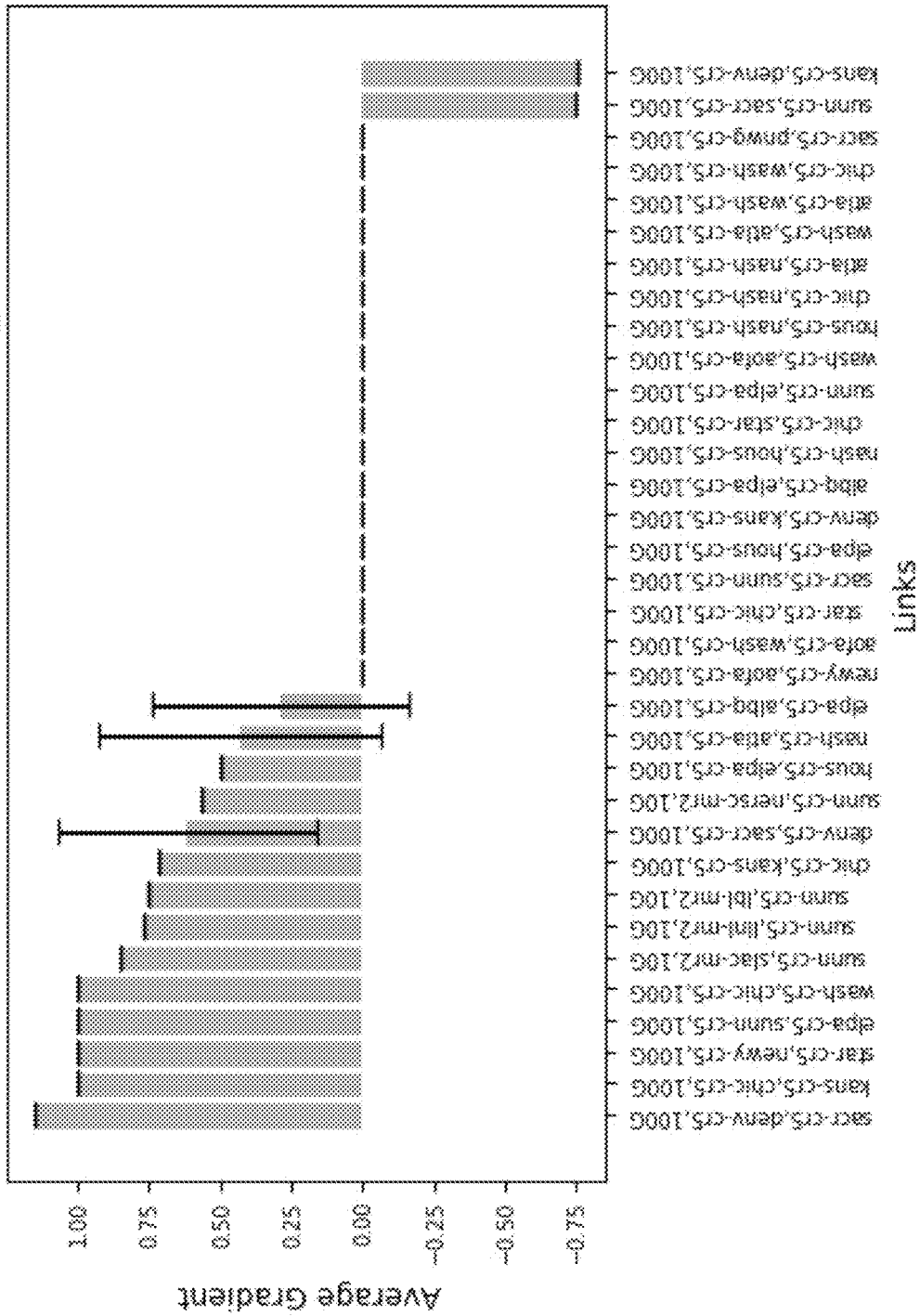
Figure 17:
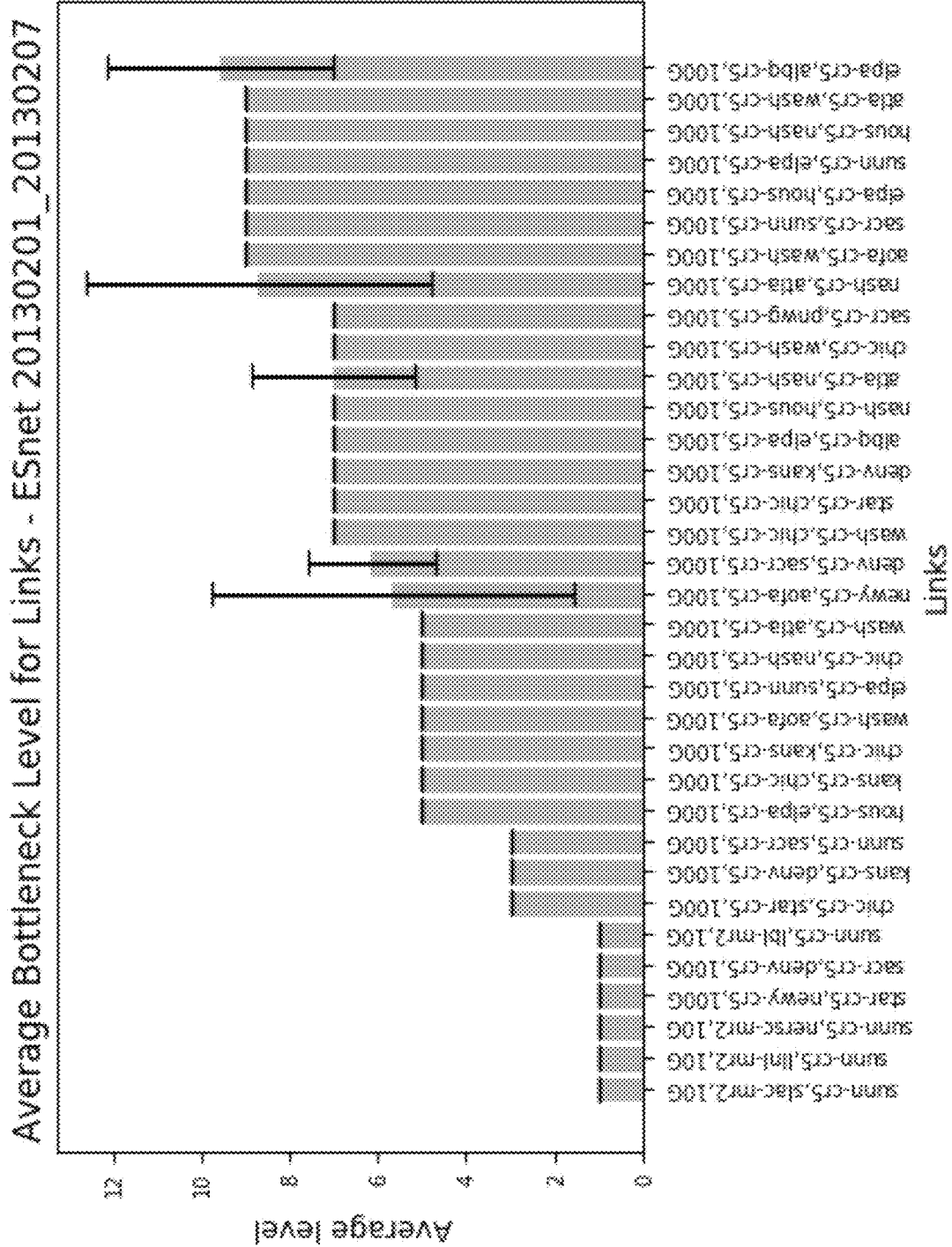
Figure 18:
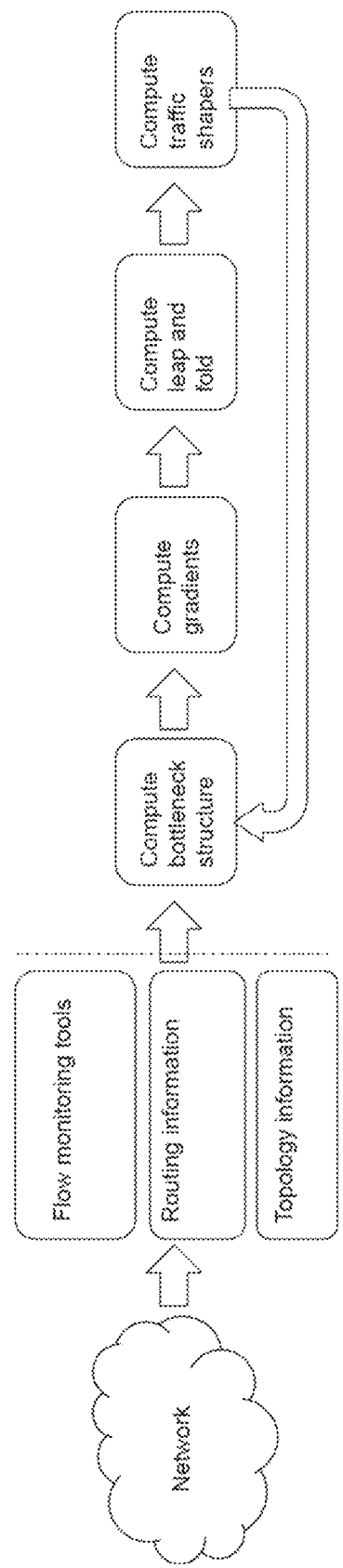
Figure 19:
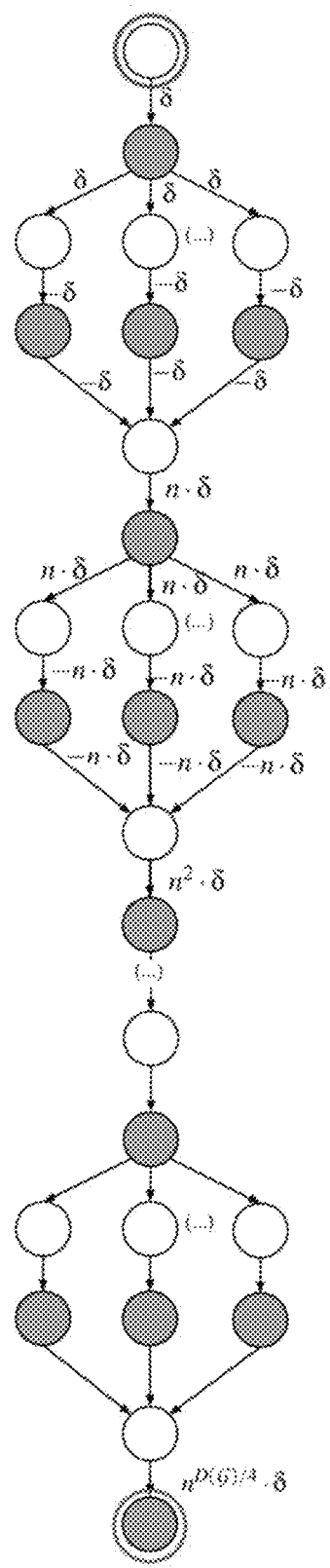

FIG. 3 presents a procedure to determine leaps and folds associated with flows and links, according to various embodiments;

FIG. 4 presents a procedure to optimize a flow using flow and link gradients, according to various embodiments;

FIG. 5 depicts one topology of an example network;

FIGS. 6A-6C show a sequence of gradient graphs and corresponding bottleneck structures generated using various embodiments of the procedure depicted in FIG. 4;

FIG. 7 depicts another topology of the example network shown in FIG. 5;

FIG. 8A shows a bottleneck structure of the network shown in FIG. 7;

FIGS. 8B and 8C show bottleneck structures of the network upon adding a flow to the network, according to different embodiments;

FIG. 9 depicts an example fat-tree network topology;

FIGS. 10A-10C depict different bottleneck structures resulting from alloting, according to different embodiments, different link capacities of certain links of the network of FIG. 9;

FIGS. 11A-11C illustrate the respective performance of network flows for the three bottleneck structures shown in FIGS. 6A-6C, using the BBR congestion control algorithm, according to some embodiments;

FIGS. 11D-11F illustrate the respective performance of network flows for the three bottleneck structures shown in FIGS. 6A-6C, using the TCP Cubic congestion control algorithm, according to some embodiments;

FIGS. 12A and 12B show the respective rates of two flows, when those flows are added to a network, according to two different embodiments;

FIGS. 13A-13C depict different bottleneck structures resulting from alloting, according to different embodiments, different link capacities of certain links of a network, and using the BBR congestion control technique;

FIGS. 13D-13F depict different bottleneck structures resulting from alloting, according to different embodiments, different link capacities of certain links of a network, and using the TCP Cubic congestion control technique;

FIG. 14 depicts the topology of an example network that is analyzed using varios embodiments;

FIG. 15 is a screenshot of the dashboards of a tool implementing an embodiment of the flow-analysis techniques, and showing a bottleneck structure;

FIGS. 16 and 17 show the average link gradients and bottleneck levels derived using one embodiment;

FIG. 18 illustrates the overall network analysis and/or manipulation or control process, according to various embodiments; and FIG. 19 illustrates the effect of a perturbation on a bottleneck structure, according to various embodiments.

DETAILED DESCRIPTION

1 Introduction

While it is generally true that a flow's performance is limited by the state of its bottleneck link, we recently discovered how bottlenecks in a network interact with each other through a structure—which we call the bottleneck structure—that depends on the topological, routing and flow control properties of the network. A related structure is described in co-pending U.S. patent application Ser. No. 16/580,718, titled "Systems and Methods for Quality of Service (Qos) Based Management of Bottlenecks and Flows in Networks," filed on Sep. 24, 2019, which is incorporated herein by reference. U.S. patent application Ser. No. 16/580, 718 (which may also refer to the graph structure described therein as a bottleneck structure), generally describes qualitative properties of the bottleneck precedence graph (BPG), a structure that analyzes the relationships among links.

In the discussion below, we introduce a new bottleneck structure called the gradient graph. One important difference between the gradient graph and the BPG is that the gradient graph also describes the relationships among flows and links, providing a more comprehensive view of the network. Another important difference is that the gradient graph enables a methodology to quantify the interactions among flows and links, resulting in a new class of techniques and algorithms to optimize network performance. The bottleneck structure describes how the performance of a bottleneck can affect other bottlenecks, and provides a framework to understand how perturbations on a link or flow propagate through a network, affecting other links and flows. If the congestion control problem for data networks were an iceberg, the traditional single-bottleneck view would be its tip and the bottleneck structure would be its submerged portion, revealing how operators can optimize the performance of not just a single flow but of the overall system-wide network.

Thus, we present herein a quantitative theory of bottleneck structures, a mathematical framework and techniques that results in a set of polynomial time algorithms that allow us to quantify the ripple effects of perturbations in a network. Perturbations can either be unintentional (such as the effect of a link failure or the sudden arrival of a large flow in a network) or intentional (such as the upgrade of a network link to a higher capacity or the modification of a route with the goal of optimizing performance). With the framework described herein, a network operator can quantify the effect of such perturbations and use this information to optimize network performance.

In particular:
- A new generalized bottleneck structure called gradient graph is introduced, which captures the space-solution of a congestion control algorithm and provides a framework to quantify the effects of perturbations in the network. A polynomial-time algorithm to compute the gradient graph is presented. (Section 2.2.)
- The concepts of link and flow gradient are introduced. These operators quantify the effects of infinitesimally small perturbations in a network. A linear-time technique to compute the gradients is presented. (Section 2.3.)
- The concepts of leap and fold are presented, which allow us to compute the effect that perturbations of arbitrary size have on a network. This leads to a polynomial-time algorithm for traveling along the solution space of a congestion control problem. We show how this procedure can be used to reconfigure networks to a higher performance operational point. (Section 2.4.)
- Examples demonstrating the applications of the proposed framework are provided. These include applications in the areas of capacity planning, network design, flow control and routing. (Section 3.)
- Experiments on TCP/IP networks are provided, demonstrating the validity of the framework described herein. These experiments include tests with BBR and Cubic congestion control algorithms. (Section 4.)

The techniques described herein are generally applicable to networks that transport commodity flows. In addition to communication networks, examples include (but are not limited to) vehicle networks, energy networks, fluidic networks, and biological networks. For example, the problem of vehicle networks generally involves identifying optimized designs of the road system that allows for a maximal amount of vehicles that can circulate through the network without congesting it or, similarly, minimizing the level of congestion for a given amount of circulating vehicles. In this case, vehicles are analogous to packets in a data network, while flows correspond to the set of vehicles going from location A to location B at a given time that follow the same path.

The capacity planning techniques described below can be used to analyze the need to construct a road to mitigate congestion hotspots, compute the right amount of capacity needed for each road segment, and to infer the projected effect on the overall performance of the road system. Similarly, the routing techniques described below can be used to suggest drivers alternative paths to their destination that would yield higher throughput or, equivalently, lower their destination arrival time.

The problem of energy networks generally includes transporting energy from the locations where energy is generated to the locations where it is consumed. For instance, energy can be in the form of electricity carried via the electrical grid. Other examples include fluidic networks, which can carry crude oil, natural gas, water, etc., or biological networks that may carry water, nutrients, etc.

Biological networks, through evolution, may tend to organize themselves in optimized structures that maximize their performance (in terms of transporting nutrients) and/or minimize the transportation costs. For instance, a tree transports sap from the root to its branches and in both directions. The sap transported from the root to its branches and leaves is called xylem, which carries energy and nutrients found from the soil where the tree is planted.

The sap transported from the leaves and branches to the root is called phloem, which carries also important nutrients obtained from the biochemical process of photosynthesis performed in the cells of the leaves. In both networks (upward and downward), it is likely that the network transporting the sap performs optimally in terms of minimizing the amount of energy required to transport a given amount of sap. Such optimized designs can be generated for the types of networks, using the bottleneck structures and perturbation propagation based thereon, as discussed below. Biological networks can themselves be optimized based on such analysis.

2 Theoretical Framework

2.1 Network Model

In their simplest form, networks are systems that can be modeled using two kinds of elements: links, which offer communication resources with a limited capacity; and flows, which make use of such communication resources. We formalize the definition of network as follows:

Definition 1 Network. We say that a tuple $\mathcal{N} = (\mathcal{N}, \mathcal{F}, \{c_l, \forall l \in \mathcal{L}\})$ is a network if:

$\mathcal{N}$ is a set of links of the form $\{l_1, l_2, \ldots, l_{|\mathcal{L}_1|}\}$, $\mathcal{F}$ is a set of flows of the form $\{f_1, f_2, \ldots, f_{|\mathcal{F}|}\}$, and $c_l$ is the capacity of link $l$, for all $l \in \mathcal{L}$.

Each flow f traverses a subset of links $\mathcal{L}_f \subset \mathcal{L}$ and, similarly, each link l is traversed by a subset of flows $\mathcal{F}_l \subset \mathcal{F}$. We will also adopt the convenient notation $f = \mathcal{L}_f$ and $l = \mathcal{F}_l$. That is, a flow is the list of links that it traverses and a link is the list of flows that traverse it. Finally, each flow f transmits data at a rate $r_f$ and the capacity constraint $\Sigma_{\forall f \in l} r_f \leq c_l$ must hold for all $l \in \mathcal{L}$.

A core concept upon which our framework resides is the notion of a bottleneck link. Intuitively, a link in a network is a bottleneck if its capacity is fully utilized. Mathematically and in the context of this work, we will use a more subtle definition:

Definition 2 Bottleneck link. Let $\mathcal{N} = (\mathcal{L}, \mathcal{F}, \{c_l, \forall l \in \mathcal{L}\})$ be a network where each flow $f \in \mathcal{F}$ transmits data at a rate $r_f$ determined by a congestion control algorithm (e.g., TCP's algorithm). We say that flow f is bottlenecked at link l—equivalently, that link l is a bottleneck to flow f—if and only if:

Flow f traverses link l, and $$\frac{\partial r_f}{\partial c_l} \neq 0.$$

That is, the transmission rate of flow f changes upon small changes of link l's capacity.

This definition of bottleneck generalizes some of the classic definitions found in the literature, while differing from them in that it focuses on the notion of perturbation, mathematically expressed as a derivative of a flow rate with respect to the capacity of a link, $$\frac{\partial r_f}{\partial c_l}.$$

(As an example to illustrate that our definition of bottleneck is relatively flexible, in Section 7.1 we show that it corresponds to a generalization of the classic max-min definition.) The general character of the bottleneck definition used in various embodiments described herein is relevant in that it makes our framework applicable not just to specific rate allocation assignments (e.g., max-min, proportional fairness, etc.) or to specific congestion control algorithms (e.g., BBR, Cubic, Reno, etc.), but to any class of congestion control solutions, such as those available in today's networks and those may be developed subsequently, provided that the two conditions in Definition 2 hold.

We complete the description of the network model introducing the concept of fair share:

Definition 3 Fair share of a link. Let $\mathcal{N} = (\mathcal{L}, \mathcal{F}, \{c_l, \forall l \in \mathcal{L}\})$ be a network. The fair share $s_l$ of a link $l \in \mathcal{L}$ is defined as the the rate of the flows that are bottlenecked at such link.

The flows bottlenecked at a link may all have the same rate that may be the same as the faire share of the link. As used throughout the discussion below, the concept of link fair share is dual to the concept of flow rate. That is, all the mathematical properties that are applicable to the rate of a flow, are also applicable to the fair share of a link.

2.2 The Gradient Graph

Our objective is to derive a mathematical framework capable of quantifying the effects that perturbations on links and flows exert on each other. Because the bottleneck structure described in U.S. patent application Ser. No. 16/580,718 considers only the effects between bottleneck links, we need a generalization of such structure that can also describe the effects of perturbations on flows. We refer to this data structure as the gradient graph, formally defined as follows (the name of this graph derives from the fact that perturbations can mathematically be expressed as derivatives or, more generically, as gradients):

Definition 4A Gradient graph. The gradient graph is a digraph such that:
1. For every bottleneck link and for every flow, there exists a vertex.
2. For every flow f:
   (a) If f is bottlenecked at link l, then there exists a directed edge from l to f;
   (b) If f is not bottlenecked at link l but it traverses it, then there exists a directed edge from f to l.

We may also employ a variation of the Definition 4A as:

Definition 4B Gradient graph. The gradient graph is a digraph such that:
1. For every bottleneck link and for every flow, there exists a vertex.
2. For every flow f:
   (a) If f is bottlenecked at link l, then there exists a directed edge from l to f;
   (b) If f traverses link l, then there exists a directed edge from f to l.

By way of notation, in the discussion below we will use the terms gradient graph and bottleneck structure indistinguishably. Intuitively, a gradient graph describes how perturbations on links and flows propagate through a network as follows. A directed edge from a link l to a flow f indicates that flow f is bottlenecked at link l (Condition 2(a) in Definitions 4A and 4B). A directed edge from a flow f to a link l indicates that flow f traverses but is not bottlenecked at link l (Condition 2(b) in Definition 4A), and a bidirectional edge from a flow f to a link l indicates that flow f traverses (and is bottlenecked at) link l (Condition 2(b) in Definition 4B).

From Definition 2, this necessarily implies that a perturbation in the capacity of link l will cause a change on the transmission rate of flow f, $$\frac{\partial r_f}{\partial c_l} \neq 0.$$

A change in the value of $r_f$, in turn, creates a perturbation that propagates to all the other links traversed by flow f, following the direction of those edges departing from flow f and arriving at such links (Conditions 2(b) in Definitions 4A or 4B). This basic process of (1) inducing a perturbation in a vertex in a graph (either in a link or a flow vertex) followed by (2) propagations in the departing edges of the vertex, creates a ripple effect in the bottleneck structure, terminating at the leaves of the gradient graph.

The relevancy of the gradient graph as a data structure to help understand network performance is captured in the following lemma, which mathematically describes how perturbations propagate through a network.

Lemma 1 Propagation of network perturbations.
1. The following characterizes the propagation of a perturbation in a bottleneck link:
   (a) A perturbation in a link l induced by a change on its capacity $c_l$ will propagate to another link l' affecting its fair share $s_{l'}$ if and only if l' is a descendant of l in the gradient graph.
   (b) A perturbation in a link l induced by a change on its capacity $c_l$ will propagate to a flow f affecting its transmission rate $r_f$ if and only if f is a descendant of l in the gradient graph.
2. Let f be a flow bottlenecked at link l. The following characterizes the propagation of a perturbation in a flow:
   (a) A perturbation in f induced by a change on its transmission rate $r_f$ will propagate to a link l' affecting its fair share $s_{l'}$, if and only if l' is a descendant of l in the gradient graph.
   (b) A perturbation in f induced by a change on its transmission rate $r_f$ will propagate to a flow f' affecting its transmission rate $r_{f'}$, if and only if f' is a descendant of l in the gradient graph.

Proof. See Section 7.2.

Leveraging Lemma 1, we are now in a position to formally define the regions of influence of a data network.

Definition 5 Regions of influence in a data network. We define the region of influence of a link l, denoted as $\mathcal{R}(l)$, as the set of links and flows that are affected by a perturbation in the capacity $c_l$ of link l, according to Lemma 1. Similarly, we define the region of influence of a flow f, denoted as $\mathcal{R}(f)$, as the set of links and flows that are affected by a perturbation in the transmission rate $r_f$ of flow f, according to Lemma 1.

From Lemma 1, we know that the region of influence of a link (or a flow) corresponds to its descendants in the gradient graph. Such regions are relevant to the problem of network performance analysis and optimization because they describe what parts of a network are affected by perturbations on the performance of a link (or a flow). In Section 2.3, it is discussed how such influences can be quantified using the concept of link and flow gradient.

We can now introduce the GradientGraph (Algorithm 1A, FIG. 1A), an embodiment of a procedure that computes the gradient graph of a network. The algorithm works as follows. In line 4, a fair share (Definition 3) estimate of each link is computed. Lines 5 and 6 select all links that currently have the smallest fair share among those links with which they share a flow. For each of these links: (1) all the flows remaining in the network that traverse them are assigned the fair share of the link (line 7), removed from the network (line 10) and put into the set of flows that have converged to their theoretical transmission rate $C^k$ (line 11); (2) the link itself is also removed (line 10); and (3) directed edges are added to the gradient graph that go from the link to all the flows bottlenecked at it (line 8) and from each of these flows to the rest of the links that they traverse (line 9). This iterative process is repeated until all flows have converged to their theoretical rate (line 3). The algorithm returns the gradient graph $\mathcal{G}$, the fair share of each link $\{s_l, \forall l \in \mathcal{L}\}$ and the rate of each flow $\{r_f, \forall f \in \mathcal{F}\}$.

Lemma 2A states the time complexity of the Gradient-Graph algorithm:

Lemma 2A Time complexity of the GradientGraph algorithm. The time complexity of running GradientGraph( ) is $O(H \cdot |\mathcal{L}|^2 + |\mathcal{L}| \cdot |\mathcal{F}|)$, where H is the maximum number of links traversed by any flow.

Proof. See Section 7.4.1

FIG. 1B shows another embodiment of GradientGraph (Algorithm 1B). In this embodiment, the algorithm begins with crude estimates of the fair share rates of the links, and iteratively refines them until all the capacity in the network has been allocated and the rate of each flow reaches its final value. In the process, the gradient graph is constructed level by level. The algorithm starts by initializing the available capacity of each link (line 3), estimating its fair share (line 4) and adding all links to a min-heap by taking their fair share value as the key (line 5). At each iteration, the algorithm picks the unresolved link with the lowest fair share value from the min-heap (line 8).

Once this link is selected, all unresolved flows remaining in the network that traverse it are resolved. That is, their rates are set to the fair share of the link (line 12) and they are added to the set of vertices of the gradient graph V (line 13). In addition, directed edges are added in the gradient graph between the link and all the flows bottlenecked at it (line 10) and from each of these flows to the other links that they traverse (line 15). Lines 16-17-18 update the available capacity of the link, its fair share, and the position of the link in the min-heap according to the new fair share. Finally, the link itself is also added as a vertex in the gradient graph (line 22). This iterative process may be repeated until all flows have been added as vertices in the gradient graph (line 7). The algorithm returns the gradient graph G, the fair share of each link $\{s_l, \forall l \in \mathcal{L}\}$ and the rate of each flow $\{r_f, \forall f \in \mathcal{F}\}$.

Lemma 2B provides the run-time complexity of this embodiment of the GradientGraph( ) algorithm:

Lemma 2B. Time complexity of GradientGraph( ). The time complexity of running GradientGraph( ) is $O(|L| \log |L| \cdot H)$, where H is the maximum number of flows that traverse a single link.

Proof. See Section 7.4.2.

The GradientGraph is memory efficient, as well. In particular, various embodiments of the GradientGraph include a respective vertex for each link and a respective vertex for each flow. As such, the number of vertices in a Gradient-Graph is $O(|\mathcal{L}| + |\mathcal{F}|)$. The edges in the graph from a link vertex to one or more flow vertices do not include, however, an edge to each and every flow vertex where that flow vertex represents a flow traversing the link corresponding to the link vertex. Rather, edges exist from a link vertex to a flow vertex only if, as described above, a flow corresponding to that flow vertex is bottlenecked at the link corresponding to the link vertex. This minimizes the total number of edges in various embodiments and implementations of Gradient-Graph.

Since the memory required to construct a GradientGraph is a function of (e.g., proportional to the total number of vertices and the total number of edges, the identification of the bottleneck structure facilitates efficient memory allocation in various embodiments. Specifically, in some cases, the memory to be allocated can be a function of the total number of link vertices to flow vertices edges, denoted ($|E_b^{l \to f}|$) where $|E_b^{l \to f}|$ is a sum of the number of bottlenecked flows at each link. The required memory may be proportional to $O(|\mathcal{L}|+|\mathcal{F}|+|E|)$, where the set $\{E\}$ includes the set of edges from flow vertices to link vertices, denoted $\{E^{f \to l}\}$ and the set of edges from link vertices to flow vertices corresponding to bottlenecked flows, denoted $\{E^{l \to f}\}$. In some cases, the total number of flows bottlecknecked at a link l is less than the total number of flows traversing the link l, minimizing the number of edges $|E^{l \to f}|$.

Since, for one or more links, all flows traversing such links may not be bottlenecked at those respective links, the total number of link-to-flow edges (or the total number of bidirectional link-to-flow edges) that are required may be minimized compared to a network graph structure having, for each link, and edge from a corresponding link vertex to vertices corresponding to all flows traversing the link. This can facilitate a memory efficient storage of the gradient graph. Thus, the derivation of the bottleneck structure can minimize the memory required to store and manipulate such a structure, in various embodiments.

2.3 Link and Flow Gradients

In this section, we focus on the problem of quantifying the ripple effects created by perturbations in a network. Because networks include links and flows, generally there are two possible causes of perturbations: (1) those originating from changes in the capacity of a link and (2) those originating from changes in the rate of a flow. This leads to the concept of link and flow gradient, formalized as follows:

Definition 6 Link and flow gradients. Let $\mathcal{N} = \langle \mathcal{L}, \mathcal{F}, \{c_l, \forall l \in \mathcal{L}\} \rangle$ be a network. We define:

The gradient of a link $l^* \in \mathcal{L}$ with respect to some other link $l \in \mathcal{L}$, denoted with $$\nabla_{l^*}(l), \text{ as } \nabla_{l^*}(l) = \frac{\partial s_l}{\partial c_{l^*}}.$$

The gradient of a link $l^* \in \mathcal{L}$ with respect to some flow $f \in \mathcal{F}$, denoted with $\nabla_{f^*}(f)$, as $$\nabla_{f^*}(f) = \frac{\partial r_f}{\partial c_{f^*}}.$$

The gradient of a flow $f^* \in \mathcal{F}$ with respect to some link $l \in \mathcal{L}$, denoted with $\nabla_{f^*}(l)$, as $$\nabla_{f^*}(l) = \frac{\partial s_l}{\partial r_{f^*}}.$$

The gradient of a flow $f^* \in \mathcal{F}$ with respect to some other flow $f \in \mathcal{F}$, denoted with $$\nabla_{f^*}(f), \text{ as } \nabla_{f^*}(f) = \frac{\partial r_f}{\partial r_{f^*}}.$$

Intuitively, the gradient of a link measures the impact that a fluctuation on the capacity of a link has on other links or flows. In real networks, this corresponds to the scenario of physically upgrading a link or, in programmable networks, logically modifying the capacity of a virtual link. Thus, link gradients can generally be used to resolve network design and capacity planning problems. Similarly, the gradient of a flow measures the impact that a fluctuation on its rate has on a link or another flow. For instance, this scenario corresponds to the case of traffic shaping a flow to alter its transmission rate or changing the route of a flow-which can be seen as dropping the rate of that flow down to zero and adding a new flow on a different path. Thus, flow gradients can generally be used to resolve traffic engineering problems. (In Section 3 applications in real networks that illustrate each of these scenarios are provided.)

Before describing how link and flow gradients can be efficiently computed using the gradient graph, we introduce the concept of flow drift:

Definition 7 Drift. Let $\mathcal{N} = \langle \mathcal{L}, \mathcal{F}, \{c_l, \forall l \in \mathcal{L}\} \rangle$ be a network and assume $\langle \mathcal{G}, \{s_l, \forall l \in \mathcal{L}\}, \{r_f, \forall f \in \mathcal{F}\} \rangle$ is the output of GradientGraph($\mathcal{N}$) (Algorithms 1A or 1B). Let $\delta$ be an infinitesimally small perturbation performed on the capacity of a link $l^* \in \mathcal{L}$ (equivalently, on the rate of a flow $f^* \in \mathcal{F}$). Let also $s_l + \Delta_l$ and $r_f + \Delta_f$ be the fair share of any link $l \in \mathcal{L}$ and the rate of any flow $f \in \mathcal{F}$, respectively, after the perturbation $\delta$ has propagated through the network. We will call $\Delta_l$ and $\Delta_f$ the drift of a link l and a flow f, respectively, associated with perturbation $\delta$.

Intuitively, the drift corresponds to the change of performance experienced by a link or a flow when another link or flow is perturbed. Using this concept, the following lemma describes how the gradient graph structure introduced in Definition 4 encodes the necessary information to efficiently calculate link and flow gradients in a network:

Lemma 3 Gradient graph invariants. Let $\mathcal{N} = \langle \mathcal{L}, \mathcal{F}, \{c_l, \forall l \in \rangle\} \mathcal{L}$ be a network and let $\mathcal{G}$ be its gradient graph. Let $\delta$ be an infinitesimally small perturbation performed on the capacity of a link $l^* \in \mathcal{L}$ (equivalently, on the rate of a flow $f^* \in \mathcal{F}$) and let $\Delta_l$ and $\Delta_f$ be the drifts caused on a link $l \in \mathcal{L}$ and a flow $f \in \mathcal{F}$, respectively, by such a perturbation. Assume also that the perturbation propagates according to the gradient graph $\mathcal{G}$ by starting on the link vertex $l^*$ (equivalently, on the flow vertext $f^*$) and following all possible directed paths that depart from it, while maintaining the following invariants at each traversed vertex:

Invariant 1: Link equation.

$$\Delta_l = -\frac{\sum_{1 \le i \le m} \Delta_{f_i}}{n}, \text{ where } \Delta_{f_1}, \ldots, \Delta_{f_m}$$

are the flow drifts entering link vertex l and n is its outdegree.

Invariant 2: Flow equation. $\Delta_f = \min\{\Delta_{l_i}, 1 \le i \le m\}$, where $\Delta_{l_1}, \ldots, \Delta_{l_m}$ are the link drifts entering flow vertex f.

Let also $\mathcal{G}'$ be the gradient graph of the resulting network after the perturbation has propagated. Then, if $\mathcal{G} = \mathcal{G}'$, the link and flow gradients can be computed as follows:

$$\Delta_{f^*}(l) = \frac{\partial s_l}{\partial c_{l^*}} = \frac{\Delta_l}{\delta}; \nabla_{l^*}(f) = \frac{\partial r_f}{\partial c_{l^*}} = \frac{\Delta_f}{\delta};$$

$$\nabla_{f^*}(l) = \frac{\partial s_l}{\partial r_{f^*}} = \frac{\Delta_l}{\delta}; \nabla_{f^*}(f) = \frac{\partial r_f}{\partial r_{f^*}} = \frac{\Delta_f}{\delta}.$$

Proof. See Section 7.3.

The previous lemma states that if the gradient graph does not change its structure upon a small perturbation (i.e., $\mathcal{G} = \mathcal{G}'$) and the two invariants are preserved, then such a perturbation can be measured directly from the graph. The first invariant ensures that (1) the sum of the drifts arriving to and departing from a link vertex are equal to zero and (2) the drifts departing from a link vertex are equally distributed. Intuitively, this is needed to preserve the congestion control algorithm's objective to maximize network utilization while ensuring fairness among all flows. The second invariant is a capacity feasibility constraint, ensuring that a flow's drift is limited by its most constrained bottleneck.

Figures 2A, 2B, 2C, 2D:
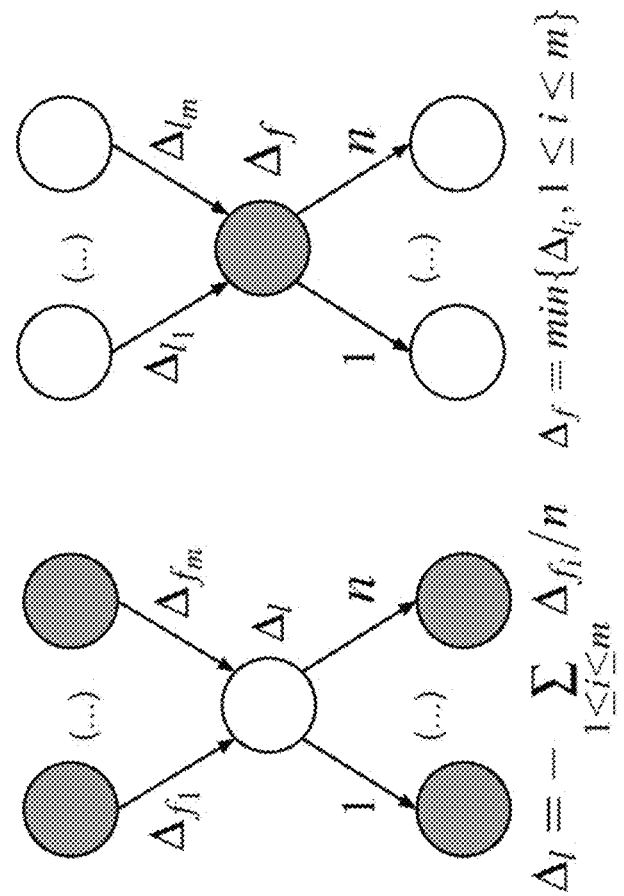

FIGS. 2A and 2B show a graphical interpretation of the link and flow equations. FIG. 2C illustrates an example to compute the link gradient $\nabla_{l_1}(f_2)$. A perturbation is applied to link $l_1$ that decreases its capacity $c_{l_1}$ by an infinitesimally small amount $\delta$. such a perturbation propagates to flow $f_1$ according to the flow equation ($\Delta_f = \min\{\Delta l_i, 1 \le i \le m\}$), resulting in a drift $\Delta_f = -\delta$. The perturbation is further propagated down to link $l_3$. Applying the link equation $$\left( \Delta_l = -\frac{\sum_{1 \le i \le m} \Delta_{f_i}}{n} \right),$$

this generates a drift on this link of $$\Delta_{l_3} = \frac{\delta}{2}.$$

Applying again the flow equation on $f_2$, we obtain the flow drift $$\Delta_{f_2} = \frac{\delta}{2}.$$

Thus, using Lemma 3, the gradient of link $l_1$ with respect to flow $f_2$ is $$\nabla_{l_1}(f_2) = \frac{\Delta_{f_2}}{\delta} = \frac{1}{2}.$$

FIG. 2D illustrates an example of flow gradient computation which shows that for this bottleneck structure, the gradient of flow $f_1$ with respect to flow $f_4$ is $\nabla_{f_1}l(f_4) = -2$.

It should be noted that it is feasible for a link or flow gradient to have a value larger than 1. Such gradients are of interest because they mean that an initial perturbation of one unit at some location of a network, generates a perturbation at another location of more than one unit. For instance, a gradient of the form $\nabla_{f^*}(f) > 1$ implies that reducing the rate of flow $f^*$ by one unit creates a perturbation that results in an increase on the rate of flow $f$ by more than one unit, thus creating a multiplicative effect. Such gradients can be used to identify arbitrage situations—e.g., configurations of the network that increase the total flow of a network. Because of their relevance, we will use the term power gradient to refer to such effect:

Definition 8 Power gradient. Let $\mathcal{N} = \langle \mathcal{L}, \mathcal{F}, \{c_l, \forall l \in \mathcal{L}\} \rangle$ be a network and let $\delta$ be an infinitesimally small perturbation performed on a flow or link $x \in \langle \cup \mathcal{L},$ producing a drift $\Delta_y$, for all $y \in \mathcal{L} \cup \mathcal{F}$. If $\Delta_y > \delta$, equivalently $\nabla_x(y) > 1$, then we will say that $\nabla_x(y)$ is a power gradient. In Section 3, we provide examples of power gradients. For now, we conclude this section stating a property of boundedness that all gradients in congestion-controlled networks satisfy:

Property 1 Gradient bound. Let $\mathcal{N} = \langle \mathcal{L}, \mathcal{F}, \{c_l, \forall l \in \mathcal{L}\} \rangle$ be a network and let $\mathcal{G}$ be its gradient graph. Let $\delta$ be an infinitesimally small perturbation performed on a flow or link $x \in \mathcal{L} \cup \mathcal{F}$, producing a drift $\Delta_y$, for all $y \in \mathcal{L} \cup \mathcal{F}$. Then, $$\nabla_x(y) = \frac{\Delta_y}{\delta} \le d^{\frac{D(\mathcal{G})}{4}},$$

where $D(X)$ is the diameter function of a graph $X$ and d is the maximum indegree and outdegree of any vertex in the graph.

Proof. See Section 7.5.

2.4 Leaps and Folds

The concepts of link and flow gradients introduced in the previous section provide a methodology to measure the effect of perturbations on a network that are small enough (infinitesimally small) to avoid a structural change in the gradient graph (see Lemma 3). In this section, we introduce the concepts of leap and fold, which allow us to generalize the framework to measure perturbations of arbitrary sizes. Two simple and intuitive examples of such kind of perturbations found in real networks include: a link failure, which corresponds to the case its capacity goes down to zero; or the re-routing of a flow, which corresponds to the case its rate goes down to zero and a new flow is initiated.

From Lemma 3, we know that if a perturbation in the network is significant enough to modify the structure of the gradient graph (i.e., $\mathcal{G} \ne \mathcal{G}'$), then the link and flow equations (FIGS. 2A and 2B) cannot be used to compute the gradients of such a perturbation. In this section, we present a technique that can be used to measure perturbations of arbitrary sizes by using the concepts of leap and fold:

Definition 9 Gradient leap. Let $\nabla_x(y)$ be a gradient resulting from an infinitesimally small perturbation $\delta$ on a link or flow x, where $x,y \in \mathcal{L} \cup \mathcal{F}$. Suppose that we intensify such a perturbation by a factor k, resulting in an actual perturbation of $\lambda = k \cdot \delta$, for some $k > 0$. Further, assume that k is the largest possible value that keeps the structure of the gradient graph invariant upon perturbation k. Then, we will say that k is the leap of gradient $\nabla_x(y)$.

The following lemma shows the existence of folds in the bottleneck structure when its corresponding network is reconfigured according to the direction indicated by a gradient and by an amount equal to its leap:

Lemma 4 Folding links. Let $\mathcal{N} = \langle \mathcal{L}, \mathcal{F}, \{c_l, \forall l \in \mathcal{L}\} \rangle$ be a network and let $\mathcal{G}$ be its gradient graph. Let X be the leap of a gradient $\nabla_x(y)$, for some $x,y \in \mathcal{L} \cup \mathcal{F}$. Then, there exist at least two links l and l' such that: (1) for some $f \in \mathcal{F}$, there is a directed path in $\mathcal{G}$ of the form 1→f→l'; and (2) $s_l=s_{l'}$, after the perturbation has propagated through the network.

Proof. See Section 7.6.

Intuitively, the above lemma states that when a perturbation is large enough to change the structure of the gradient graph, such structural change involves two links l and l' directly connected via a flow f (i.e., forming a path l→f→l') that have their fair shares collapse on each other ($s'_l=s'_{l'}$,) after the perturbation has propagated. The faire shares can be substantially or approximately equal (e.g., the difference between the faire shares can be zero or less than a specified threshold, e.g., 10%, 5%, 2%, 1%, or even less of the fair share of one of the links.) Graphically, this corresponds to the folding of two consecutive levels in the bottleneck structure. We can now formalize the definition of fold as follows.

Definition 10 Fold of a gradient. Let λ be the leap of a gradient $\nabla_x(y)$, for some x, y∈$\mathcal{L} \cup \mathcal{F}$, and let l and l' be two links that fold once the perturbation λ has propagated through the network (note that from Lemma 4, such links must exist). We will refer to the tuple (l,l') as a fold of gradient $\nabla_x(y)$.

Algorithm 2 shown in FIG. 3 introduces LeapFold( ), a procedure to compute the leap and the fold of a link or flow gradient. Intuitively, for each pair of link vertices l and l' in the bottleneck structure that are directly connected via a flow vertex (in line 4, l' is a link successor of l), we compute the maximum amount Δ that can be traveled along the gradient without the collision of the two links' fair share (line 5). The minimum value of λ among all such pairs of links corresponds to the leap (line 7), while the links themselves constitute a fold (line 8). The algorithm returns both the leap and the fold (line 12).

The concept of leap and fold is relevant in that it enables a methodology to efficiently travel along the solution space defined by the bottleneck structure, towards reaching a certain performance objective is achieved. Specifically, for some x,y∈$\mathcal{L} \cup \mathcal{F}$, if x is perturbed negatively so as to benefit another flow or link in the network, but only up to the leap of x, i.e., λ, the negative and positive changes may be balanced. On the other hand, if x is perturbed negatively by more than its λ, the positive impact of this perturbation on another flow or link would not exceed λ, potentially resulting in degradation of the overall network performance.

We introduce a method in Algorithm 3, MinimizeFCT( ), shown in FIG. 4, that can identify a set of perturbations needed in a network to minimize the completion time of a given flow $f_s$ (also referred to as flow completion time (FCT)). The algorithm starts (line 2) by identifying a maximal gradient $\nabla_{f^*}(f_s)$. This corresponds to a direction in the solution space that improves the performance of $f_s$ maximally. Then, it travels along such gradient by an amount equal to its leap (lines 6 through 11). This is achieved by adding a logical link $l_k$ that acts as a traffic shaper reducing the rate of flow f* by the leap amount. This causes the intended perturbation, thus resulting in the increase of flow $f_s$'s rate by the amount leap×$\nabla_{f^*}(f_s)$.

From Lemma 4, we know that the additional traffic shaper changes the structure of the gradient graph, at which point we need to iterate again the procedure (line 1) to recompute the new values of the gradients based on the new structure. This process is repeated iteratively until either no more positive gradients are found or the performance of $f_s$ has increased above a given rate target ρ (lines 3 and 4). In the next section, an example is presented demonstrating how embodiments of MinimizeFCT( ) may be used to optimize the performance of a time-bound constrained flow.

3 Applications to Data Networks

Because the existence of bottleneck structures are a fundamental property intrinsic to any congestion-controlled data network, its applications are numerous in a variety of network communication problems. In this section, our goal is to present some examples illustrating how the proposed Theory of Bottleneck Structures (TBS) introduced in the previous section can be used to resolve some of these problems. We show that in each of them, the framework is able to provide new insights into one or more operational aspects of a network. The examples presented in this section are not exhaustive, but only illustrative. To help organize the breadth of applications, we divide them in two main classes: traffic engineering and capacity planning. For each of these classes, we provide specific examples of problems that relate to applications commonly found in modern networks.

3.1 Traffic Engineering 3.1.1 Scheduling Time-Bound Constrained Flows

Suppose that our goal is to accelerate a flow $f_s \in F$ in a network $\mathcal{N}$ with the objective that such flow is completed before a certain time-bound requirement. A common application for the optimization of time-bound constrained flows can be found in research and education networks, where users need to globally share data obtained from their experiments, often involving terabytes or more of information—e.g., when scientists at the European Organization for Nuclear Research (CERN) need to share data with other scientific sites around the world using the LHCONE network. Another common use case can be found in large scale data centers, where massive data backups need to be transferred between sites to ensure redundancy. In this context, suppose the operators are only allowed to sacrifice the performance of a subset of flows $\mathcal{F}' \subset \mathcal{F}$ {$f_s$}, considered of lower priority than $f_s$. What flows in $\mathcal{F}'$ present an optimal choice to accelerate $f_s$? By what amount should the rate of such flows be reduced? And by what amount will flow $f_s$ be accelerated?

To illustrate that we can use TBS to resolve this class of problems, consider the network shown in FIG. 5. This topology generally corresponds to Google's B4 network. In this experiment, assume there are eight flows, F={$f_1$, $f_2$, ..., $f_8$}, routed as shown in the figure. While real-life networks usually operate with a much higher number of flows, in our example we use a reduced number merely to simplify the descriptions of the bottleneck structures and the steps followed to resolve the given problem. This is without loss of generality and the same approach is applicable to large scale operational networks, as discussed below.

To identify an optimal strategy for accelerating an arbitrary flow in a network, we use an implementation of the MinimizeFCT( ) procedure (Algorithm 3, FIG. 4). Assume that our objective is to accelerate flow $f_7$ (i.e., $f_s=f_7$) in FIG. 5—the transatlantic flow that connects data centers 8 and 12—towards meeting a certain flow completion time constraint. FIGS. 6A-6C provide a sequence of gradient graphs generated by Algorithm 3 every time line 6 is executed. The graphs include the values of the fair share $s_l$ next to each link vertex l and the rate $r_f$ next to each flow vertex f.

FIG. 6A corresponds to the gradient graph of the initial network configuration shown in FIG. 5. At this iteration, the gradient calculations are: $\nabla_{f_1}(f_7)=-2$, $\nabla_{f_2}(f_7)=-1$, $\nabla_{f_3}(f_7)=1$, $\nabla_{f_4}(f_7)=2$, $\nabla_{f_5}(f_7)=-1$, $\nabla_{f_8}(f_7)=1$, $\nabla_{f_9}(f_7)=0$. Thus, in line 2 we have $f_4$=argmax$_{f \in F}\nabla_f(f_s)=2$. From FIG. 6A, it can be observed that the reduction of flow $f_4$'s rate creates a perturbation that propagates through the bottleneck structure via two different paths: $f_4 \to l_2 \to f_2 \to l_3 \to f_3 \to l_4 \to f_7$ and $f_4 \to l_4 \to f_7$. Each of these paths has an equal contribution to the gradient of value 1, resulting in $\nabla_{f4}(f_7)=2$. Note that since this value is larger than 1, it is understood to be a power gradient (Definition 8).

In line 7, we invoke LeapFold($\mathcal{L}, \mathcal{F}, f_4$) (Algorithm 2, FIG. 3), which results in a fold $(l_4, l_6)$ and a leap value of 0.5. In lines 8-11, we add a traffic shaper that reduces the rate of flow $f_4$ by 0.5 units (the value of the leap), bringing its value from 2.375 down to 1.875. This is implemented in Algorithm 3 (FIG. 4) by adding to the network a new link $l_i$ $\mathcal{L}_{i+1}=l_7$ (line 9) that is only traversed by flow $f_4$ (line 10) and with a capacity value of $c_{l_7}=1.875$ (line 11). From Definition 9, this corresponds to the maximum reduction of flow $f_4$'s rate that preserves the structure of the gradient graph. When the rate of $f_4$ is reduced by exactly 0.5, then the two links in the fold $(l_4, l_6)$ collapse into the same level, as shown in FIG. 6B ($s_{l_4}=s_{l_6}=11.25$), changing the bottleneck structure of the network. At this point, flow $f_7$ becomes bottlenecked at both of these links (FIG. 6B), completing a first iteration of Algorithm 3 (FIG. 4).

The second iteration, thus, starts with the original network augmented with a traffic shaper $l_7$ that forces the rate of flow $f_4$ to be throttled at 1.875. Using its bottleneck structure (FIG. 6B), it can be seen that we can further accelerate flow $f_7$ by decreasing the rate of flows $f_3$ and $f_8$, since both have a direct path to flow $f_7$ that traverses its bottleneck links $l_4$ and $l_6$. To ensure a maximal increase on the performance of flow $f_7$, we need to equally reduce the rate of both flows ($r_{f3}$ and $r_{f8}$) so that the fair shares of the two bottleneck links ($s_{l_4}$ and $s_{l_6}$) increase at an equal pace. This can be achieved by adding two new traffic shapers $l_8$ and $l_9$ to throttle the rate of flows $f_3$ and $f_8$, respectively, down from their current rates of 6.875 and 11.25, i.e.: $c_{l_8}=6.875-x$ and $c_{l_9}=11.25-x$. Since the gradient of any flow (generally the flow to be accelerated) can be computed with respect to the flow to be traffic shaped, how much each flow will be decelerated or accelerated can be determined. With this information, the maximum value of the factor x that will not decelerate any flow below the minimum completion time or another specified threshold can be determined.

In FIG. 6C, we show the resulting bottleneck structure when choosing a value of $x=5.6250$ ($c_{l_8}=1.25$ and $c_{l_9}=5.625$). Note that there is some flexibility in choosing the value of this parameter, depending on the amount of acceleration required on flow $f_7$. In this case we chose a value that ensures none of the flows that are traffic shaped receives a rate lower than any other flow. With this configuration, flow $f_3$'s rate is reduced to the lowest transmission rate, but such value is no lower than the rate of flows $f_5$ and $f_6$ ($r_{f3}=r_{f5}=r_{f6}=1.25$). Thus, the flow completion time of the slowest flow is preserved throughout the transformations performed in this example.

In summary, a strategy to maximally accelerate the performance of flow $f_7$ consists in traffic shaping the rates of flows $f_3$, $f_4$ and $f_8$ down to 1.25, 1.875 and 5.625, respectively. Such a configuration results in an increase to the rate of flow $f_7$ from 10.25 to 16.875, while ensuring no flow performs at a rate lower than the slowest flow in the initial network configuration.

3.1.2 Identification of High-Bandwidth Routes

In this section, we show how TBS can also be used to identify high-bandwidth routes in a network. We will consider one more time the B4 network topology, but assume there are two flows (one for each direction) connecting every data center in the US with every data center in Europe, with all flows following a shortest path. Since there are six data centers in the US and four in Europe, this configuration has a total of 48 flows ($|\mathcal{F}|=6\times 4\times 2=48$), as shown in FIG. 7. (See Tables 3A-1 and 3A-2 showing the exact path followed by each flow.) All links are assumed to have a capacity of 10 Gbps except for the transatlantic links, which are configured at 20 Gbps ($c_l=10$, for all $l \notin \{l_8, l_{10}\}$, $c_{l_8}=c_{l_{10}}=20$).

FIG. 8A shows the corresponding bottleneck structure obtained from running Algorithm 1A (FIG. 1A). This structure shows that flows are organized in two levels: the top-level includes flows $\{f_1, f_2, f_3, f_4, f_5, f_6, f_7, f_8, f_{10}, f_{13}, f_{14}, f_{15}, f_{16}\}$ and the low-level includes flows $\{f_6, f_9, f_{11}, f_{12}, f_{17}, f_{18}, f_{19}, f_{20}, f_{21}, f_{22}, f_{23}, f_{24}\}$. Note that because each pair of data centers is connected via two flows (one for each direction), without loss of generality, in FIG. 8A we only include the first 24 flows (flows transferring data from US to Europe), since the results are symmetric for rest of the flows—i.e., flow $f_i$ has the same theoretical transmission rate and is positioned at the same level in the bottleneck structure as flow $f_{i+24}$, for all $1 \leq i \leq 24$.

Note also that all the top-level flows operate at a lower transmission rate (with all rates at 1.667) than the bottom-level flows (with rates between 2.143 and 3). This in general is a property of all bottleneck structures: flows operating at lower levels of the bottleneck structure have higher transmission rates than those operating at levels above. Under this configuration, suppose that we need to initiate a new flow $f_{25}$ to transfer a large data set from data center 4 to data center 11. Our objective in this exercise is to identify a high-throughput route to minimize the time required to transfer the data.

Because the bottleneck structure reveals the expected transmission rate of a flow based on the path it traverses, we can also use TBS to resolve this problem. In 8B we show the bottleneck structure obtained for the case that $f_{25}$ uses the shortest path $l_{15} \to l_{10}$. Such configuration places the new flow at the upper bottleneck level—the lower-throughput level—in the bottleneck structure, obtaining a theoretical rate of $r_{25}=1.429$.

Note that the presence of this new flow slightly modifies the performance of some of the flows on the first level (flows $\{f_1, f_3, f_4, f_5, f_7, f_8\}$ experience a rate reduction from 1.667 to 1.429), but it does not modify the performance of the flows operating at the bottom level. This is because, for the given configuration, the new flow only creates a shift in the distribution of bandwidth on the top level, but the total amount of bandwidth used in this level stays constant. (In FIG. ??, the sum of all the flow rates on the top bottleneck level is $1.667\times 12=20$, and in FIG. ?? this value is the same: $1.429\times 7+1.667\times 6=20$.) As a result, the ripple effects produced from adding flow $f_{25}$ into the network cancel each other out without propagating to the bottom level.

Assume now that, instead, we place the newly added flow on the non-shortest path $l_{16} \to l_8 \to l_{19}$. The resulting bottleneck structure is shown in FIG. 8C. This configuration places flow $f_{25}$ at the bottom level—the higher-throughput level—in the bottleneck structure, thus resulting in a rate value $r_{25}=2.5$, an increase of 74.95% with respect to the shortest path solution. Another positive outcome of this solution is that none of the flows operating at the upper level (the flows that receive less bandwidth) see their rate reduced. This is a direct consequence of Lemma 1, since a perturbation on lower levels have no ripple effects on upper levels.

In conclusion, for the given example, the non-shortest path solution achieves both a higher throughput for the newly placed flow and better fairness in the sense that such allocation—unlike the shortest path configuration—does not deteriorate the performance of the most poorly treated flows.

3.2 Capacity Planning

3.2.1 Design of Fat-Tree Networks in Data Centers

In this experiment, we illustrate how TBS can be used to optimize the design of fat-tree network topologies. Fat-trees are generally understood to be universally efficient networks in that, for a given network size s, they can emulate any other network that can be laid out in that size s with a slowdown at most logarithmic in s. This property is one of the underlying mathematical principles that make fat-trees (also known as folded-clos or spine-and-leaf networks) highly competitive and one of the most widely used topologies in large-scale data centers and high-performance computing (HPC) networks.

Consider the network topology in FIG. 9, which corresponds to a binary fat-tree with three levels and six links ($\mathcal{L}$ {$l_1, l_2, \ldots, l_6$}). Assume also that there are two flows (one for each direction) connecting every pair of leaves in the fat-tree network, providing bidirectional full-mesh connectivity among the leaves. Since there are four leaves, that results in a total of 4×3=12 flows. All of the flows are routed following the shortest path, as shown in Table 1 below. For the sake of convention, we adopt the terminology from data center architectures and use the names spine and leaf links to refer to the upper and lower links of the fat-tree network, respectively.

TABLE 1

Path followed by each flow in the fat-tree networks experiments

| Flow | Experiment 1,2,3: Links traversed |
|---|---|
| $f_1$ | {$l_1, l_2$} |
| $f_2$ | {$l_1, l_5, l_6, l_3$} |
| $f_3$ | {$l_1, l_5, l_6, l_4$} |
| $f_4$ | {$l_1, l_2$} |
| $f_5$ | {$l_2, l_5, l_6, l_3$} |
| $f_6$ | {$l_2, l_5, l_6, l_4$} |
| $f_8$ | {$l_3, l_6, l_5, l_2$} |
| $f_9$ | {$l_3, l_4$} |
| $f_{10}$ | {$l_4, l_6, l_5, l_1$} |
| $f_{11}$ | {$l_4, l_6, l_5, l_2$} |
| $f_{12}$ | {$l_4, l_3$} |

We fix the capacity of the leaf links to a value $\lambda$ (i.e., $c_{l_1}=c_{l_2}=c_{l_3}=c_{l_4}=\lambda$) and the capacity of the spine links to $\lambda \times \tau$ (i.e., $c_{l_5}=c_{l_6}=\lambda \times \tau$), where i is used as a design parameter enabling a variety of network designs. For instance, in our binary fat-tree example, the case $\tau=2\lambda$ corresponds to a full fat-tree network, because the total aggregate bandwidth at each level of the tree is constant, $c_{l_1}+c_{l_2}+c_{l_3}+c_{l_4}=c_{l_5}+c_{l_6}=4\lambda$. Similarly, the case $\tau=1$ corresponds to a thin-tree network, since it results with all the links having the same capacity, $c_{l_i}=\lambda$, for all $1 \leq i \leq 6$. The conventional technique of optimizing the performance-cost trade-off of a fat-tree network by adjusting the capacity of the spine links is sometimes referred as bandwidth tapering.

The focus of our experiment is to use the bottleneck structure analysis to identify optimized choices for the tapering parameter $\tau$. In FIGS. 10A-10C, we present sequences of bottleneck structures (obtained from running Algorithm 1A (FIG. 1A)) corresponding to our fat-tree network with three different values of the tapering parameter $\tau$ and fixing $\lambda=20$. Note that the fixing of $\lambda$ to this value is without loss of generality, as the following analysis applies to any arbitrary value $\lambda>0$.

The first bottleneck structure (FIG. 10A) corresponds to the case $\tau=1$ (i.e., all links have the same capacity, $c_{l_i}=20$, for all $1 \leq i \leq 6$). This solution leads to a bottleneck structure with flows confined in one of two possible levels: a top level, where flows perform at a lower rate, $r_{f_2}=r_{f_3}=r_{f_5}=r_{f_6}=r_{f_7}=r_{f_8}=r_{f_{10}}=r_{f_{11}}=2.5$; and a bottom level, where flows perform at twice the rate of the top-level flows, $r_{f_1}=r_{f_4}=r_{f_9}=r_{f_{12}}=5$. This configuration is thus unfair to those flows operating at the top bottleneck. Furthermore, if the data sets to be transferred over the fat-tree are known to be symmetric across all nodes, this configuration is not optimal. This is because in such workloads, a task is not completed until all flows have ended. Thus, the best configuration in this case is one that minimizes the flow completion time of the slowest flow. Let us consider how we can use TBS to identify a value of $\tau$ that achieves this objective.

By looking at the bottleneck structure in FIG. 10B, we know that the slowest flows are confined in the top bottleneck level. In order to increase the rates of these flows, we need to increase the tapering parameter $\tau$ that controls the capacity of the spine links $l_5$ and $l_6$. Such action transforms the bottleneck structure by bringing the two levels closer to each other, until they fold. We can obtain the collision point by computing the link gradients and their leap and fold as follows. The link gradient of any of the spine links with respect to any of the top-level flows is $\nabla_l(f)=0.125$, for all $l \in \{l_5, l_6\}$ and $f \in \{f_2, f_3, f_5, f_6, f_7, f_8, f_{10}, f_{11}\}$.

On the other hand, the link gradient of any of the spine links with respect to any of the low-level flows is $\nabla_l(f)=-0.25$, for all $l \in \{l_5, l_6\}$ and $f \in \{f_1, f_4, f_9, f_{12}\}$. That is, an increase by one unit on the capacity of the spine links increases the rate of the top-level flows by 0.125 and decreases the rate of the low-level flows by 0.25. Since the rates of the top and low-level flows are 2.5 and 5, respectively, this means that the two levels will fold at a point where the tapering parameter satisfies the equation $2.5+0.125 \cdot \tau \cdot \lambda = 5 - 0.25 \cdot \tau \cdot \lambda$, resulting in $$\tau = \frac{4}{3}$$

and, thus, $c_{l_5}=c_{l_6}=26.667$.

Note that this value corresponds exactly to the leap of the spine links gradient, and thus can also be programmatically obtained using Algorithm 2 (FIG. 3). The resulting bottleneck structure for this configuration is shown in FIG. 10B, confirming the folding of the two levels. This fat-tree configuration is optimal in that the flow completion time of the slowest flow is minimal. Because the bottleneck structure is folded into a single level, this configuration also ensures that all flows perform at the same rate, $r_{f_i}=3.333$, for all $1 \leq i \leq 6$.

What is the effect of increasing the tapering parameter above 4/3? This result is shown in FIG. 10C for the value of $\tau=2$, i.e., $c_{l_5}=c_{l_6}=40$. In this case, the two spine links are no longer bottlenecks to any of the flows (since these links are leaves in the bottleneck structure), but all flows continue to perform at the same rate, $r_f=3.333$, for all $1 \leq i \leq 6$. Thus, increasing the capacity of the upper-level links does not yield any benefit, but increases the cost of the network. This result indicates that the fat-tree network shown in FIG. 9 should not be designed with an allocation of capacity on the spine links higher than $$\tau = \frac{4}{3}$$

times the capacity of the leaf links.

In summary, for the fat-tree network shown in FIG. 9 we have:

A tapering parameter $$\tau \geq \frac{4}{3}$$

should never be used, as that is as efficient as a design with $$\tau = \frac{4}{3},$$

but more costly.

A tapering parameter $$\tau = \frac{4}{3}$$

is optimal in that it minimizes the flow completion time of the slowest flow. This should be the preferred design in symmetric workloads that transfer about the same amount of data between any two nodes.

A tapering parameter $$\tau < \frac{4}{3}$$

can be used if workloads are asymmetric, identifying the right value of i that produces the right amount of bandwidth at each level of the bottleneck structure according to the workload.

Note that this result might be counter-intuitive if we take some of the established conventional best practices. For instance, while a full fat-tree ($\tau=2$, in our example) is generally considered to be efficient, the analysis of its bottleneck structure, as presented above, demonstrates that such design is inefficient when flows are regulated by a congestion-control protocol, as is the case of many data centers and HPC networks. See section 4.3 where we experimentally demonstrate this result using TCP congestion control algorithms. It should be understood that the value of i, in general, will depend on the network topology and would not always be 3 but that given a network topology, an optimized value of r can be determined using the gradient graph and the leap-fold computation, as described above.

4 Experiments

We have implemented various embodiments of the algorithms and processes described herein in a tool that provides a powerful, flexible interface to emulate networks of choice with customizable topology, routing, and traffic flow configurations. It uses Mininet and the POX SDN controller to create such highly customizable networks. It also uses iPerf internally to generate network traffic and offers an interface to configure various flow parameters such as the source and destination hosts, start time, and data size, among others. This tool also offers an integration with sFlow-RT agent that enables real-time access to traffic flows from Mininet emulated network. Since Mininet uses real, production grade TCP/IP stack from the Linux kernel, it can be an ideal testbed to run experiments using congestion control protocols such as BBR and Cubic to study bottleneck structures and flow performance in a realistic way. Apart from its flexible configuration interface, our tool also offers a set of useful utilities to compute and plot various performance metrics such as instantaneous network throughput, flow convergence time, flow completion time, or Jain's fairness index, among others for a given experiment.

We used our tool, to experimentally verify and demonstrate that the framework described above can be used to address various practical network operational issues outlined in Section 3. We ran several experiments by varying the network topology, traffic flow configuration, routing scheme, and congestion control protocols.

Results shown in this section are based on experiments run using the BBR (bottleneck bandwidth and round-trip propagation time) congestion control algorithm and for similar experiments run using Cubic. For each experiment, we used Jain's fairness index as an estimator to measure how closely the bottleneck structure model matches with the experimental results. For all BBR experiments presented in the next sections, this index was above 0.99 accuracy on a scale from 0 to 1 (See Section 4.4), reflecting the strength of our framework in modeling network behavior.

4.1 Time-Bound Constrained Data Transfers

The objective of this experiment is to empirically demonstrate the results obtained in Section 3.1.1, reproducing the three steps required in that exercise to identify the optimal set of traffic shapers to accelerate flow $f_7$ as shown in FIGS. 6A-6C. FIGS. 11A-11C present the results of the three steps, illustrating the performance of the flows for each of the three bottleneck structures shown in FIGS. 6A-6C using the BBR congestion control algorithm. The legends in these figures describe the flows, where the notation $h_x$-$h_y$ means that the flow goes from host $h_x$ to host $h_y$. To map the flows according to FIG. 5, we use the convention that host $h_x$ is located in data center x. For instance, flow $h_8$-$h_{12}$ in FIGS. 11A-11C corresponds with flow $f_7$ in FIG. 5, which starts at datacenter 8 and ends at datacenter 12.

TABLE 2A

Experimental vs. theoretical average flow transmission rate (in Mbps) using BBR

| Flow | Experiment 1 | Experiment 2 | Experiment 3 |
|---|---|---|---|
| $f_1$ | 2.44/2.37 | 2.57/2.87 | 2.65/2.87 |
| $f_2$ | 4.78/5.12 | 5.16/5.62 | 5.33/5.62 |
| $f_3$ | 6.99/7.37 | 6.57/6.87 | 1.18/1.25 |
| $f_4$ | 2.72/2.37 | 1.74/1.87 | 1.73 1.87 |
| $f_5$ | 1.18/1.25 | 1.33/1.25 | 1.29/1.25 |
| $f_6$ | 1.42/1.25 | 1.19/1.25 | 1.19/1.25 |
| $f_7$ | 9.51/10.25 | 9.81/11.25 | 15.34/16.87 |
| $f_8$ | 11.48/12.25 | 11.06/11.25 | 5.27/5.62 |

Table 2A shows the transmission rate obtained for each of the flows and for each of the three experiments. Next to each experimental rate, this table also includes the theoretical value according to the bottleneck structure.

FIG. 11A shows the results of running the initial network without any traffic shapers, corresponding to the bottleneck structure in FIG. 6A. From Table 2A, we see that all flow rates are able to follow their theoretical value from slightly below. Such offset between experimental and theoretical rates is a characteristic that generally holds for all experiments, and is due to imperfections in the distributed nature of the congestion control algorithm (e.g., due to its inability to instantaneously converge to the optimal transmission rate or due to statistical packet drops produced by the asynchronous nature of the network). However, the table illustrates that the experimental rates behave according to the bottleneck structure of the network. This is also reinforced by the fact that Jain's fairness index is above 0.99 for all experiments. (See Section 4.4).

FIG. 11B shows the result of adding the first traffic shaper after running the first iteration of an embodiment of the MinimizeFCT( ) procedure (Algorithm 3, FIG. 4). This traffic shaper is configured to reduce the rate of flow $f_4$ by a leap of 0.5 Mbps. As predicted by the bottleneck structure, this increases the rate of flow $f_7$ (the purple flow $h_8$-$h_{12}$ in FIG. 11B), from 9.51 to 9.81 Mbps (Table 2A).

FIG. 11C shows the result of adding two additional traffic shapers to reduce the rate of flows $f_3$ and $f_4$ by an amount of 5.625 Mbps, according to the results of running the second iteration of the embodiment of MinimizeFCT( ) algorithm. Recall from Section 3.1.1 that such leap has the effect to maximally increase the rate of flow $f_7$ without decreasing any of the flows' rate below the rate of the slowest flow. We see this behavior in FIG. 11C, where flow $f_7$ (purple flow) has now the highest rate, while the flow completion time of the slowest flow is maintained at slightly above 400 seconds, throughout the three experiments (FIGS. 11A-11C). In summary, the combined effect of the three traffic shapers accelerates flow $f_7$ from 9.51 to 15.34 Mbps (theoretically, from 10.25 to 16.87 Mbps), thus, very closely following the behavior predicted by the bottleneck structure, while maintaining the maximum flow completion time of the network. Table 2B and FIGS. 11D-11F show similar results when Cubic was used for congestion control.

TABLE 2B

Experimental vs. theoretical average flow transmission rate (in Mbps) using TCP Cubic

| Flow | Experiment 1 | Experiment 2 | Experiment 3 |
|---|---|---|---|
| $f_1$ | 3.91/2.37 | 5.10/2.87 | 4.43/2.87 |
| $f_2$ | 5.26/5.12 | 6.39/5.62 | 5.94/5.62 |
| $f_3$ | 6.83/7.37 | 6.17/6.87 | 1.04/1.25 |
| $f_4$ | 2.74/2.37 | 1.40/1.87 | 1.38 1.87 |
| $f_5$ | 1.09/1.25 | 1.15/1.25 | 1.14/1.25 |
| $f_6$ | 2.04/1.25 | 2.10/1.25 | 2.01/1.25 |
| $f_7$ | 10.22/10.25 | 10.49/11.25 | 14.4/16.87 |
| $f_8$ | 10.62/12.25 | 10.58/11.25 | 5.37/5.62 |

4.2 Identification of High-Throughput Routes

In this set of experiments, we empirically demonstrate the correctness of the high-throughput path identified from the bottleneck structure analysis in Section 3.1.2. We start by creating the B4 network configuration shown in FIG. 7, with a total of 48 shortest-path flows connecting every pair of nodes (in both directions) between the US and Europe. Tables 2A-1 and 2A-2 present the exact path followed by each flow, in experiments 1 (designating the new flow to the shortest path) and 2 (designating the flow to the non-shortest path), respectively. We then add two extra flows labeled $f_{25}$ and $f_{50}$ (one for each direction) to connect data centers 4 and 11 and perform two separate experiments: one placing the flows on the shortest path $l_{10}$↔$l_{15}$; another one placing them on a longer path $l_{16}$↔$l_8$↔$l_{19}$.

TABLE 3A-1

Exact path followed when the flow is added to the shortest path
Experiment 1:

| Flow | Links traversed |
|---|---|
| $f_1$ | $\{l_3, l_{15}, l_{10}, l_{18}\}$ |
| $f_2$ | $\{l_5, l_7, l_8\}$ |
| $f_3$ | $\{l_3, l_{15}, l_{10}\}$ |
| $f_4$ | $\{l_3, l_{15}, l_{10}, l_{14}\}$ |
| $f_5$ | $\{l_{15}, l_{10}, l_{18}\}$ |
| $f_6$ | $\{l_{16}, l_8\}$ |
| $f_7$ | $\{l_{15}, l_{10}\}$ |
| $f_8$ | $\{l_{13}, l_{10}, l_{14}\}$ |
| $f_9$ | $\{l_{13}, l_6, l_{10}, l_{18}\}$ |
| $f_{10}$ | $\{l_{13}, l_7, l_8\}$ |
| $f_{11}$ | $\{l_{13}, l_6, l_{10}\}$ |
| $f_{12}$ | $\{l_{13}, l_6, l_{10}, l_{14}\}$ |
| $f_{13}$ | $\{l_7, l_8, l_9\}$ |
| $f_{14}$ | $\{l_7, l_8\}$ |
| $f_{15}$ | $\{l_7, l_8, l_{19}\}$ |
| $f_{16}$ | $\{l_7, l_8, l_{11}\}$ |
| $f_{17}$ | $\{l_{10}, l_{18}\}$ |
| $f_{18}$ | $\{l_{10}, l_{19}\}$ |
| $f_{19}$ | $\{l_{10}\}$ |
| $f_{20}$ | $\{l_{10}, l_{14}\}$ |
| $f_{21}$ | $\{l_8, l_9\}$ |
| $f_{22}$ | $\{l_8\}$ |
| $f_{23}$ | $\{l_8, l_{19}\}$ |
| $f_{24}$ | $\{l_8, l_{11}\}$ |
| $f_{25}$ | $\{l_{15}, l_{10}\}$ |

TABLE 3A-2

Exact path followed when the flow is added to the non-shortest path
Experiment 2:

| Flow | Links traversed |
|---|---|
| $f_1$ | $\{l_3, l_{15}, l_{10}, l_{18}\}$ |
| $f_2$ | $\{l_5, l_7, l_8\}$ |
| $f_3$ | $\{l_3, l_{15}, l_{10}\}$ |
| $f_4$ | $\{l_3, l_{15}, l_{10}, l_{14}\}$ |
| $f_5$ | $\{l_{15}, l_{10}, l_{18}\}$ |
| $f_6$ | $\{l_{16}, l_8\}$ |
| $f_7$ | $\{l_{15}, l_{10}\}$ |
| $f_8$ | $\{l_{13}, l_{10}, l_{14}\}$ |
| $f_9$ | $\{l_{13}, l_6, l_{10}, l_{18}\}$ |
| $f_{10}$ | $\{l_{13}, l_7, l_8\}$ |
| $f_{11}$ | $\{l_{13}, l_6, l_{10}\}$ |
| $f_{12}$ | $\{l_{13}, l_6, l_{10}, l_{14}\}$ |
| $f_{13}$ | $\{l_7, l_8, l_9\}$ |
| $f_{14}$ | $\{l_7, l_8\}$ |
| $f_{15}$ | $\{l_7, l_8, l_{19}\}$ |
| $f_{16}$ | $\{l_7, l_8, l_{11}\}$ |
| $f_{17}$ | $\{l_{10}, l_{18}\}$ |
| $f_{18}$ | $\{l_{10}, l_{19}\}$ |
| $f_{19}$ | $\{l_{10}\}$ |
| $f_{20}$ | $\{l_{10}, l_{14}\}$ |
| $f_{21}$ | $\{l_8, l_9\}$ |
| $f_{22}$ | $\{l_8\}$ |
| $f_{23}$ | $\{l_8, l_{19}\}$ |
| $f_{24}$ | $\{l_8, l_{11}\}$ |
| $f_{25}$ | $\{l_{16}, l_8, l_{19}, l_{20}\}$ |

FIG. 12A shows the rate of flow $f_{25}$ for the two experiments. Similar results are obtained for the reverse-path flow $f_{50}$, as shown in FIG. 12B. In the legend of this plot, experiment 1 and 2 correspond to the shortest and longer-path configurations, respectively. As predicted by the bottleneck structure, the longer path achieves a higher throughput and, thus, a lower flow completion time. Tables 2B and 2C present the average throughput obtained for all twenty-five flows from the US to Europe and for each of the two experiments, alongside the theoretical values according to the bottleneck structure. (The results obtained from the other twenty-five flows on the reverse path are very similar.)

TABLE 3B

Experimental vs. theoretical average flow transmission rate (in Mbps) using BBR

| Flow | Shortest path | Longer path |
|---|---|---|
| $f_1$ | 1.463/1.428 | 1.571/1.666 |
| $f_2$ | 1.508/1.666 | 1.498/1.666 |
| $f_3$ | 1.306/1.428 | 1.427/1.666 |
| $f_4$ | 1.431/1.428 | 1.527/1.666 |
| $f_5$ | 1.314/1.428 | 1.413/1.666 |
| $f_6$ | 2.539/3.000 | 2.181/2.500 |
| $f_7$ | 1.214/1.428 | 1.385/1.666 |
| $f_8$ | 1.302/1.428 | 1.420/1.666 |
| $f_9$ | 2.068/2.142 | 2.168/2.142 |
| $f_{10}$ | 1.580/1.666 | 1.465/1.666 |
| $f_{11}$ | 1.933/2.142 | 1.948/2.142 |
| $f_{12}$ | 2.025/2.142 | 2.087/2.142 |
| $f_{13}$ | 1.497/1.666 | 1.481/1.666 |
| $f_{14}$ | 1.462/1.666 | 1.429/1.666 |
| $f_{15}$ | 1.498/1.666 | 1.476/1.666 |
| $f_{16}$ | 1.497/1.666 | 1.474/1.666 |
| $f_{17}$ | 1.838/2.142 | 1.864/2.142 |
| $f_{18}$ | 1.817/2.142 | 1.848/2.142 |
| $f_{19}$ | 1.773/2.142 | 1.795/2.142 |
| $f_{20}$ | 1.813/2.142 | 1.876/2.142 |
| $f_{21}$ | 2.891/3.000 | 2.174/2.500 |
| $f_{22}$ | 2.438/3.000 | 2.098/2.500 |
| $f_{23}$ | 2.550/3.000 | 2.129/2.500 |
| $f_{24}$ | 2.606/3.000 | 2.185/2.500 |
| $f_{25}$ | 1.226/1.428 | 2.386/2.500 |

As shown, flow $f_{25}$ achieves a performance of 1.226 and 2.386 Mbps for the shortest and longer paths, respectively—with the theoretical rates being 1.428 and 2.5 Mbps, respectively. Thus the longer path yields a 94% improvement on flow throughput with respect to the shortest path.

TABLE 3C

Experimental vs. theoretical average flow transmission rate (in Mbps) using TCP Cubic

| Flow | Shortest path | Longer path |
|---|---|---|
| $f_1$ | 0.917/1.428 | 0.962/1.666 |
| $f_2$ | 1.296/1.666 | 1.278/1.666 |
| $f_3$ | 1.202/1.428 | 1.315/1.666 |
| $f_4$ | 0.897/1.428 | 0.9685/1.666 |
| $f_5$ | 1.186/1.428 | 1.336/1.666 |
| $f_6$ | 2.227/3.000 | 2.126/2.500 |
| $f_7$ | 1.716/1.428 | 1.966/1.666 |
| $f_8$ | 1.211/1.428 | 1.333/1.666 |
| $f_9$ | 1.000/2.142 | 1.022/2.142 |
| $f_{10}$ | 1.291/1.666 | 1.296/1.666 |
| $f_{11}$ | 1.411/2.142 | 1.397/2.142 |
| $f_{12}$ | 0.984/2.142 | 0.999/2.142 |
| $f_{13}$ | 1.276/1.666 | 1.252/1.666 |
| $f_{14}$ | 1.841/1.666 | 1.864/1.666 |
| $f_{15}$ | 1.284/1.666 | 1.230/1.666 |
| $f_{16}$ | 1.294/1.666 | 1.292/1.666 |
| $f_{17}$ | 2.035/2.142 | 2.132/2.142 |
| $f_{18}$ | 2.097/2.142 | 2.141/2.142 |
| $f_{19}$ | 3.792/2.142 | 4.065/2.142 |
| $f_{20}$ | 2.101/2.142 | 2.115/2.142 |
| $f_{21}$ | 2.195/3.000 | 2.170/2.500 |
| $f_{22}$ | 4.168/3.000 | 3.767/2.500 |

TABLE 3C-continued

Experimental vs. theoretical average flow transmission rate (in Mbps) using TCP Cubic

| Flow | Shortest path | Longer path |
|---|---|---|
| $f_{23}$ | 2.189/3.000 | 2.046/2.500 |
| $f_{24}$ | 2.242/3.000 | 2.104/2.500 |
| $f_{25}$ | 1.679/1.428 | 1.377/2.500 |

4.3 Bandwidth Tapering on Fat-Tree Networks

The objective of this experiment is to empirically demonstrate the results obtained in Section 3.2.1, reproducing the steps to identify an optimal tapering parameter T in the binary fat-tree configuration introduced in FIG. 9. FIGS. 13A-13C present the results of the experiments for the three values of the tapering parameter, $T \in \{1, 4/3, 2\}$. Each plot shows the transmission rate of all twelve flows as part of the network configuration, with each flow transmitting a total of 64 MB of data. Following the example in Section 3.2.1, the link capacities are set as follows: $c_{l_1}=c_{l_2}=c_{l_3}=c_{l_4}=\lambda=20$ Mbps and $c_{l_5}=c_{l_6}=\lambda \times \tau=20 \times \tau$ Mbps.

TABLE 4A

| Flow completion time (seconds) using BBR | | | |
|---|---|---|---|
| Flow | $\tau = 1$ | $\tau = 4/3$ | $\tau = 2$ |
| $f_1$ | 115 | 172 | 175 |
| $f_2$ | 237 | 171 | 164 |
| $f_3$ | 239 | 177 | 156 |
| $f_4$ | 111 | 172 | 173 |
| $f_5$ | 236 | 167 | 158 |
| $f_6$ | 233 | 172 | 147 |
| $f_7$ | 223 | 152 | 144 |
| $f_8$ | 212 | 170 | 143 |
| $f_9$ | 112 | 171 | 178 |
| $f_{10}$ | 201 | 173 | 153 |
| $f_{11}$ | 226 | 174 | 154 |
| $f_{12}$ | 113 | 155 | 173 |
| max( ) | 239 | 177 | 178 |

As predicated by TBS, the case i=1 has flows operating at one of two bottleneck levels, close to the rates predicted by the bottleneck structure (2.5 Mbps for the upper-level flows and 5 Mbps for the lower-level flows, see FIGS. 10A and 13A). This fat-tree design is sub-optimal for symmetric workloads in that the flow completion time of the slowest flow is not minimal. Under this configuration, flow $f_3$ is the slowest flow and its completion time is 239 seconds. (See Table 4A for all flow completion time values.)

If we want to maximize the rate of the slowest flow, TBS tells us that the right tapering Parameter Value is 4/3. This Case is Presented in FIG. 13B, which Indeed Shows how all Flows perform at a very similar rate close to the theoretical value of 3.333 Mbps (see FIGS. 10B and 13B). This configuration is optimized in that it represents the smallest value of the tapering parameter (and thus the least costly network) that minimizes the completion time of the slowest flow. In this experiment, the completion time of the slowest flow is 177 seconds, an improvement of 25.9% with respect to the case of $\tau=1$.

FIG. 13C shows the results for the case of a full fat-tree network, $\tau=2$. Once again, as predicted by TBS, this solution achieves about the same completion time as the case $$\tau = \frac{4}{3}$$

(the slowest flow completes in 178 seconds), since in this configuration the leaf links become the bottlenecks and the extra bandwidth added in the spine links does not produce any net benefit, as shown by the bottleneck structure in FIGS. 10C and 13C. In summary, as predicted by TBS, the case $$\tau = \frac{4}{3}$$

provides an optimized design in that it is the least costly network that minimizes the completion time of the slowest flow.

Table 4B and FIGS. 13D-13F show similar results when Cubic was used for congestion control.

TABLE 4B

| Flow completion time (seconds) using TCP Cubic | | | |
|---|---|---|---|
| Flow | $\tau = 1$ | $\tau = 4/3$ | $\tau = 2$ |
| $f_1$ | 108 | 120 | 139 |
| $f_2$ | 208 | 149 | 135 |
| $f_3$ | 187 | 166 | 164 |
| $f_4$ | 80 | 127 | 139 |
| $f_5$ | 176 | 170 | 159 |
| $f_6$ | 206 | 162 | 145 |
| $f_7$ | 206 | 166 | 156 |
| $f_8$ | 210 | 143 | 146 |
| $f_9$ | 102 | 107 | 140 |
| $f_{10}$ | 190 | 163 | 158 |
| $f_{11}$ | 220 | 161 | 131 |
| $f_{12}$ | 80 | 149 | 138 |
| max( ) | 220 | 170 | 164 |

4.4 Jain's Fairness Index Results

Jain's index is a metric that rates the fairness of a set of values $x_1, x_2, \ldots, x_n$ according to the following equation:

$$\mathcal{J}(x_1, x_2, \ldots, x_n) = \frac{\left(\sum_{i=1}^{n} x_i\right)^2}{n \cdot \sum_{i=1}^{n} x_i^2} = \frac{\bar{x}^2}{\overline{x^2}}$$

The index value ranges from $$\frac{1}{n}$$

(worst case) to 1 (best case). For multi-link networks the value $x_i$ must be normalized to an optimal fairness allocation. In this discussion, we normalize $x_i$ as the ratio $$\frac{f_i}{o_i},$$

where $f_i$ is the rate of flow $f_i$ achieved through the experiments and $O_i$ is its expected max-min fair throughput. This provides an index that qualitatively measures how closely the rates obtained from the experiments are to the theoretical rates predicted by the bottleneck structure of the network. The closer this index is to 1, the more accurate the model is to the experimental results. Table 5 shows the Jain's fairness index we computed for all the experiments discussed in sections. 4.1, 4.2 and 4.3.

TABLE 5

| Jain's Fairness Index Values | | | |
|---|---|---|---|
| Algorithm | 4.1: Experiment 1 | 4.1: Experiment 2 | 4.1: Experiment 3 |
| BBR | 0.9926 | 0.9965 | 0.9985 |
| Cubic | 0.9353 | 0.9074 | 0.9218 |
| Algorithm | 4.2: Experiment 1 | 4.2: Experiment 2 | |
| BBR | 0.9954 | 0.9966 | |
| Cubic | 0.9077 | 0.8868 | |
| Algorithm | 4.3: $\tau = 1$ | 4.3: $\tau = 4/3$ | 4.3: $\tau = 2$ |
| BBR | 0.9987 | 0.9983 | 0.9939 |
| Cubic | 0.9903 | 0.9842 | 0.9957 |

4.4 Notes on Using the Gradient Graph Framework in Real-Life Networks

In this section we provide notes on using the proposed gradient graph framework in real-life networks (also called production networks). To construct the gradient graph of a network, only the information about a network $\mathcal{N} = \{\mathcal{L}, \mathcal{F}, \{c_l, \forall l \in \mathcal{L}\}\}$ is needed. The set of flows $\mathcal{F}$ can be obtained from traditional network monitoring tools such as NetFlow or sFlow, though the use of the identified tools is illustrative; not required. Other tools, available now or may become available subsequently, may be used. For each flow, the GradientGraph procedure (Algorithms 1A (FIG. 1A) or 1B (FIG. 1B)) needs to know the set of links it traverses. This information can also be obtained from NetFlow or sFlow (or other tools) provided that traffic sampling is performed at all the switches and routers of a network, as is often the case with production networks. If that is not the case, then the set of links traversed by each flow can also be derived by looking up routing table information. The set of links $\mathcal{L}$ and their capacity $\{c_l, \forall l \in \mathcal{L}\}$ can be derived from protocols such as SNMP or simply from network topology information usually available to the network operator.

4.5 Capacity Planning Using NetFlow Logs

In this section, we demonstrate how link gradients (outlined in Section 2.3) can be used by network operators in practicality for baselining networks and for identifying performance bottlenecks in a network for capacity planning purposes. We demonstrate this by integrating an embodiment of the framework described herein, where that embodiment is implemented in the tool we developed, with NetFlow logs obtained from the Energy Sciences Network (ESnet). ESnet is the U.S. Department of Energy's (DoE) large scale, high performance network that connects all the US national laboratories and supercomputing centers. It is designed to enable high-speed data transfers, and collaboration between scientists across the country. It should be understood that the use of NetFlow and ESnet are illustrative only, and that the use of any tool or technique that can provide the relevant network data, available now or developed subsequently, may be used. Likewise, the techniques described herein are generally applicable to any network and are not limited to ESnet.

Our tool includes plugins that enable integration with standard network monitoring tools such as NetFlow, sFlow, etc., and a Graphical User Interface (GUI) to visualize the gradient graph of practical networking environments. The observations drawn in this section are based on analysis of a week's worth of anonymized NetFlow logs from real traffic flows, and topology information from ESnet as shown in FIG. 14. The NetFlow logs used include flows sampled every five minutes from twenty-eight routers in ESnet. In order to analyze the NetFlow logs using the gradient graph algorithms, we need to infer the various flows and their paths (i.e., series of links traversed by the flows) and the capacity of links in the network from the NetFlow logs.

At a high level, the procedure we use to analyze NetFlow logs includes the following four steps. Step (i) Process topology information: In this step, we read the topology information provided and build a directed graph with the routers as nodes of the graph and the various links (based on BGP, IS-IS, L2 VLAN links) that connect them as directed edges between the nodes in the graph. We also save the link capacities read from the topology information. This is later used in resolving the flow path.

Step (ii) Extract TCP flows: This step consists of identifying TCP flows by deduplicating them using their source, destination IP addresses, port numbers and the flow start time. Using this info, we build a flow cache to track all the active flows in the network during the analysis window.

Step (iii) Build flow path: For each of the flows in flow cache, based on the router where the NetFlow sample was seen and the next hop router from NetFlow log, we build the flow path by correlating it with the topology information we processed earlier in step (i). If a given flow was sampled and logged by multiple routers, we pick a route that includes all such intermediate segments. By the end of this step, we have all the info we need to build a gradient graph.

Step (iv) Compute link, and flow gradients: Using the flow and link information extracted in the earlier steps, we compute the link and flow gradients for the network using our tool.

FIG. 15 is a screenshot of the dashboards of our tool showing a filtered view of the bottleneck structure we obtained from running Algorithm 1A (FIG. 1A) based on ESnet Netflow log analysis. Some of the observations we can make from this bottleneck structure include:

(1) The link {168(sunn-cr5:lbl-mr2)} with a capacity of 10 Gbps has the highest gradient. In fact, this link has a power gradient (gradient>1) with a value of 1.800 in the network. The power gradient indicates that any investment made towards capacity upgrade of this link would provide a proportionally higher reward in terms of system wide performance increase.

(2) The flows $\{f_{14}, f_{39}, f_{41}, f_{129}, f_{117}, f_{94}, f_{177}, f_{142}\}$ are bottlenecked at the link $l_{68}$. Also, we can see the rest of links and flows that are influenced by link $l_{68}$ in the network.

(3) It is also worth noting that using link gradients, we can prioritize the links to upgrade in a given network. The higher the value of the gradient, the higher the return on investment (ROI) from upgrading the link capacity on such a link.

(4) Even highly dynamic production networks such as ESnet have patterns. Identifying these patterns can be useful in baselining the network. Any deviations from this baseline model can help alert the operations team and assist in identifying the root cause of routing issues or failures. Also, these patterns can be useful in prioritizing links to invest in for maximum ROI.

Baseline models can be developed using link gradients and bottleneck levels. For instance, FIGS. 16 and 17 show the average link gradients and bottleneck levels for all the links in ESnet based on the set of flows we analyzed. The plots include the standard deviation, as a way to highlight the variation of these values from the average. From these plots, we can see that the link with the highest average gradient l78 (sacr-cr5:denv-cr5) is also one of the links with the lowest average level (level 1, indicating a link with the least throughput), showing that this link is potentially a good candidate for capacity upgrades. Similarly, the links {star-cr5:newy-cr5, sunn-cr5:slac-mr2, sunn-cr5:lini-mr2, sunn-cr5: lbl-mr2} consistently have a higher gradient value and lower bottleneck level value than the rest of the links, indicating that these links are consistently important to system-wide performance of the network.

6 Conclusions

Bottleneck structures are recently discovered graphs that describe the relationships that exist among bottleneck links and the influences they exert on each other in congestion-controlled networks. While existing work has studied these structures from a qualitative standpoint, in this disclosure we provide a quantitative theory of bottleneck structures that allows us to quantify the effects of perturbations (both unintentional and intentional) as they travel through a network. The analytical strength of a bottleneck structure stems from its ability to capture the solution-space produced by a congestion-control algorithm. This is achieved, at least in part, by combining (1) a graph structure that qualitatively defines how perturbations propagate in the network and (2) the mathematical relationships that quantify the extent to which such perturbations affect the performance of its links and flows.

We show that these perturbations can be expressed in terms of link and flow gradients. Based on this concept, we present a new family of polynomial-time and memory efficient algorithms/processes that allow us to travel within the solution-space of the applicable congestion control technique towards optimizing network performance. The outcome of various techniques and embodiments described herein includes optimized network configurations that can be practically engineered in any network, such as data networks, transportation networks, energy networks, etc., using techniques such as traffic shaping, traffic re-routing, link upgrades, or topology reconfiguration, among others. While we demonstrate the validity of the quantitative theory of bottleneck structures using Mininet, we have also proto-typed a tool that allows validation of TBS in real-world networks.

The overall network analysis and/or manipulation or control process is depicted in FIG. 18, and begins with collection of network information including flow information, link information, and topology. The flow information generally includes the identities of flow, the total count of flows, and the rates of the identified flows during a specified observation window, which can be a few minutes, a few hours, a few days, or longer. The link information includes the number of active links, their identities, and their designated and/or maximum capacities during the specified observation window. The network topology includes the network nodes and the links, typically direct links, interconnecting such nodes.

In case of data networks, the nodes may be data centers and/or computing centers, the links include data links, whether cable, wireless, or satellite based, the flow rates may include number of bits, bytes, packets, etc., passing through the links, and link capacities may be expressed in terms of available or allotted bandwidth or bit rate. In case of transportation networks, the nodes can be cities, locations within cities or a metropolitan area, airports, marine ports, etc., the links can be roadways, railways, subway routes, airline routes, marine routes, etc., the flow rates and link capacities can be expressed in terms of the number of passengers or travelers, the number of vehicles, etc.

In case of energy networks, the nodes can be energy generators such as power plants and consumers, such as towns, cities, industrial complexes, shopping centers, etc. The links include energy delivery systems including high-voltage transmission lines, substations, local energy distribution lines, etc. The flow rates and link capacity can be expressed in terms of peak energy demand, average energy demand, etc.

In case of fluidic or biological networks, the nodes can be sources and consumers of material, such as oil, gas, nutrients, blood, etc., and the link capacity can be the sizes of conduits or vessels carrying the fluids or biological materials, the pressure in such conduits or vessels, etc. In some cases, the capacity and/or rate of flow in one or more conduits/vessels can be adjusted by shutting off or pruning other conduits/vessels. The flow rate optimization and/or capacity planning can thus be used to manage or control irrigation systems, fertilizer delivery system, plant/crop disease control systems, etc.

After collecting the required information, the bottleneck structure of the network is generated and, thereafter, the GradientGraph that includes various flow and link gradients is generated using embodiments of Algorithms 1A or 1B (FIG. 1A or 1B). The derivation of GradientGraph may include efficient memory allocation, as described above in Section 3. For one or more links and/or flows of interest the respective leaps and folds are then computed using embodiments of Algorithm 2 (FIG. 3). Using the leaps and folds, one or more flows and/or one or more links may be selected for traffic shaping, i.e., for an adjustment to a property of the selected flow(s) or link(s). In particular, the rate of a flow may be decreased up to a corresponding leap and/or the allotted capacity of a link may be increased or decreased. It should be noted that the allotted capacity of link cannot exceed the physical capacity of the link.

The effect of this perturbation can be observed on the flow(s) and/or link(s) of interest, and the process may be repeated a specified number of times, until a desired effect (e.g., increase in the rate of a flow of interest) is attained, or a maximum feasible change can be attained. Such iterations may be performed under constraints, such as not permitting the flow rate of any flow below the current minimum or a specified lower-bound rate, maintaining the relative order of the flow rates, allotting at least a specified lower-bound capacity to each link, etc.

7 Mathematical Proofs

7.1 Generalization to max-min fairness

Lemma 5 If a link is a bottleneck in the max-min sense, then it is also a bottleneck according to Definition 2, but not vice-versa.

Proof. It is generally known that if a flow f is bottlenecked at link l in the max-min sense, then such a flow must traverse link l and its rate is equal to the link's fair share, $r_f = s_l$. Since a change in the capacity of a link always leads to a change in its fair share, i.e $$\frac{\partial s_l}{\partial c_l} \neq 0,$$

this necessarily implies $$\frac{\partial r_f}{\partial c_l} \neq 0.$$

Thus, f is also bottlenecked at link l in the sense of Definition 2. The reverse, however, does not hold because Definition 2 does not require that $r_f = s_l$ for a flow f bottlenecked at link l. It can be seen that this is also true for other definitions of bottleneck. For instance, a flow that is bottlenecked at a link according to proportional fairness, is also bottlenecked according to Definition 2, but the reserve is also not true.

7.2 Lemma 1 Propagation of Network Perturbations

1. The following characterizes the propagation of a perturbation in a bottleneck link:
   (a) A perturbation in a link l induced by a change on its capacity $c_l$ will propagate to another link l' affecting its fair share $s_{l'}$ if and only if l' is a descendant of l in the gradient graph.
   (b) A perturbation in a link l induced by a change on its capacity $c_l$ will propagate to a flow f affecting its transmission rate $r_f$ if and only if f is a descendant of l in the gradient graph.
2. Let f be a flow bottlenecked at link l. The following characterizes the propagation of a perturbation in a flow:
   (a) A perturbation in f induced by a change on its transmission rate $r_f$ will propagate to a link l' affecting its fair share $s_{l'}$ if and only if l' is a descendant of l in the gradient graph.
   (b) A perturbation in f induced by a change on its transmission rate $r_f$ will propagate to a flow f' affecting its transmission rate $r_{f'}$ if and only if f' is a descendant of l in the gradient graph.

Proof. Let $\mathcal{N} = (\mathcal{L}, \mathcal{F}, \{c_l, \forall l \in \mathcal{L}\})$ be a network and assume $\mathcal{G}$ is its gradient graph. Consider the two statements in 1a-1b and assume link l is affected by a perturbation. From Definition 2, we have that $$\frac{\partial r_{f^*}}{\partial c_l} \neq 0,$$

for any flow f* bottleneck at link l. From Definition 4, these corresponds to all flows f* for which there exists an edge (l,f*) in $\mathcal{G}$. Let $f_1$ be any of these flows and assume $\Delta_{f_1}$ is its drift. Such drift will induce a perturbation in all the links traversed by $f_1$ at which it is not bottlenecked.

From Definition 4 this corresponds to all the links l* for which there exists an edge $(f_1, l^*)$ in $\mathcal{G}$. This process of perturbation followed by a propagation repeats indefinitely affecting all the link and flow vertices that are descendants of link vertex l (that is, the region of influence of link l, $\mathcal{R}(l)$, according to Definition 5), which demonstrates the sufficient condition of 1a-1b. The necessary condition of these two statements is also true because, by construction from the definitions of bottleneck link and gradient graph, none of the links and flows outside $\mathcal{R}(l)$ will be affected by the perturbation. The proof of the statements in 2a-2b follow a very similar argument if we take into account that an initial perturbation of a flow f will create a perturbation in its bottleneck link. Applying 1a-1b to such link, we conclude that 2a-2b also hold.

7.3 Lemma 3 Gradient Graph Invariants

Let $\mathcal{N} = (\mathcal{L}, \mathcal{F}, \{c_l, \forall l \in \mathcal{L}\})$ be a network and let $\mathcal{G}$ be its gradient graph. Let $\delta$ be an infinitesimally small perturbation performed on the capacity of a link $l^* \in \mathcal{L}$ (equivalently, on the rate of a flow $f^* \in \mathcal{F}$) and let $\Delta_l$ and $\Delta_f$ be the drifts caused on a link $l \in \mathcal{L}$ and a flow $f \in \mathcal{F}$, respectively, by such a perturbation. Assume also that the perturbation propagates according to the gradient graph $\mathcal{G}$ by starting on the link vertex $l^*$ (equivalently, on the flow vertext $f^*$) and following all possible directed paths that depart from it, while maintaining the following invariants at each traversed vertex:

Invariant 1: Link equation.

$$\Delta_l = -\frac{\sum_{1 \le i \le m} \Delta_{f_i}}{n},$$

where $\Delta_{f_1}, \ldots, \Delta_{f_m}$ are the flow drifts entering link vertex $l$ and $n$ is its outdegree.

Invariant 2: Flow equation. $\Delta_f = \min(\Delta_{l_i} i, 1 \le i \le m)$, where $\Delta_{l_1}, \ldots, \Delta_{l_m}$ m are the link drifts entering flow vertex f. Let also $\mathcal{G}'$ be the gradient graph of the resulting network after the perturbation has propagated. Then, if $\mathcal{G} = \mathcal{G}'$, the link and flow gradients can be computed as follows:

$$\Delta_{l^*}(l) = \frac{\partial s_l}{\partial c_{l^*}} = \frac{\Delta_l}{\delta}, \nabla_{l^*}(f) = \frac{\partial r_f}{\partial c_{l^*}} = \frac{\Delta_f}{\delta}; \nabla_{f^*}(l) = \frac{\partial s_l}{\partial r_{f^*}} = \frac{\Delta_l}{\delta};$$

$$\nabla_{f^*}(f) = \frac{\partial r_f}{\partial r_{f^*}} = \frac{\Delta_f}{\delta}.$$

Proof. Perturbations can be understood as one-time modifications of the configuration of a network that bring its operational point to a new optimum. For instance, a perturbation could be a link capacity change (e.g., due to a link upgrade or a change in the signal to noise ratio of a wireless channel), a flow rate change (e.g., due to a change in the rate of a traffic shaper or the route of a flow), among others.

When such changes occur, the congestion control algorithm adjusts the rate of the flows to reach another operational target point. In traditional congestion-controlled data networks, such target includes two objectives: maximizing network utilization while ensuring fairness. Thus, the link and flow equations must take into account these two objectives to ensure that, upon a perturbation, the resulting drifts bring the network to a new operational point that preserves the level of link utilization and fairness within the solution-space imposed by the congestion control algorithm.

The link equation $$\Delta_l = -\frac{\sum_{1 \le i \le m} \Delta_{f_i}}{n}$$

ensures precisely these two objectives. First, this equation implies that $\Sigma_{1 \le i \le m} \Delta_{f_i} + n \cdot \Delta_l = 0$, which guarantees that the sum of all incoming ($\Sigma_{1 \le i \le m} \Delta_{f_i}$) and all outgoing ($n \cdot \Delta_l$) drifts on a link is zero. This means that the total flow traversing a link stays constant after the perturbation. This guarantees that all bottleneck links stay fully utilized, thus preserving the level of network utilization. The equation also ensures fairness, because all of the n flows bottleneck at it will receive the same drift $\Delta_l$, equal to the sum of incoming drifts divided by the outdegree n of the link vertex. That is, all flows bottlenecked at a link will see their rate adjusted by the same amount, thus preserving the level of fairness. The flow equation $\Delta_f = \min\{\Delta_{l_i}, 1 \le i \le m\}$ is necessary to preserve the capacity constraint at each link for the singular case where a flow is bottlenecked at more than one link. In such a case, the flow must take a drift equal to the smallest drift among all its bottlenecks.

7.4.1 Lemma 2A Time Complexity of the GradientGraph Algorithm

The time complexity of running GradientGraph( ) of FIG. 1B is $O(H \cdot |\mathcal{L}|^2 + |\mathcal{L}| \cdot |\mathcal{F}|)$, where H is the maximum number of links traversed by any flow.

Proof. We start by noting that since a link is removed from $\mathcal{L}^k$ at line 10 of the GradientGraph algorithm, then each of the lines inside the main while loop (line 3) cannot be executed more than $|\mathcal{L}|$ times. The complexity of each line inside the while loop is as follows:

Lines 4 and 5. The complexity of invoking once each of these two lines is $O(|\mathcal{L}|)$ and $O(|\mathcal{L}| \cdot H)$, respectively, where H is the maximum number of links traversed by any flow. Thus, the aggregated total execution time of these lines in one execution of the algorithm is $O(|\mathcal{L}| \cdot (|\mathcal{L}| + |\mathcal{L}| \cdot H)) = O(H \cdot |\mathcal{L}|^2)$ Lines 7, 8, 9, 10 and 11. The complexity of invoking once each of these three lines is $O(|\mathcal{F}|)$, $O(|\mathcal{F}|)$, $O(|\mathcal{F}|)$, $O(1)$ and $O(|\mathcal{F}|)$, respectively. Thus, the aggregated total execution time of these lines in one execution of the algorithm is $O(|\mathcal{L}| \cdot |\mathcal{F}|)$.

Adding up the above two values, we obtain $O(H \cdot |\mathcal{L}|^2 + |\mathcal{L}| \cdot |\mathcal{F}|)$.

7.4.2 Lemma 2B Time Complexity of GradientGraph( )

The time complexity of running GradientGraph( ) of FIG. 1B is $O(|\mathcal{L}| \log|\mathcal{L}| \cdot H)$, where H is the maximum number of flows that traverse a single link.

Proof. Note that each statement in the algorithm runs in constant time except for lines 5, 8, and 18. Each is an operation on a heap of size at most $|\mathcal{L}|$, so each will run in $\log |\mathcal{L}|$ time. Lines 5 and 8 will each run $|\mathcal{L}|$ times, since the two outer loops run at most once for each link. Line 18 will run at most once for every pair of a link with a flow that traverses it. Note that this value is less than the number of edges that are added to the gradient graph in lines 10 and 15. Thus, the number of times line 18 is run is bounded by $|\mathcal{L}| \cdot H$, where H is the maximum number of flows that traverse a single link. Thus, in total, the algorithm runs in time $O(H|\mathcal{L}|\log(|\mathcal{L}|))$.

7.5 Property 1: Gradient Bound

Let $\mathcal{N} = (\mathcal{L}, \mathcal{F}, \{c_l, \forall l \in \mathcal{L}\})$ be a network and let $\mathcal{G}$ be its gradient graph. Let $\delta$ be an infinitesimally small perturbation performed on a flow or link $x \in \mathcal{L} \cup \mathcal{F}$, producing a drift $\Delta_y$, for all $y \in \mathcal{L} \cup \mathcal{F}$. Then, $$\nabla_x(y) = \frac{\Delta_y}{\delta} \le d^{\frac{D(\mathcal{G})}{4}},$$

where D(X) is the diameter function of a graph X and d is the maximum indegree and outdegree of any vertex in the graph.

Proof. From the link and flow equations in Lemma 3, first we observe that the absolute value of a perturbation can only increase when traversing a link vertex. This is because the flow equation $\Delta_f = \min\{\Delta_{l_i}, 1 \le i \le m\}$ necessarily implies that the size of the perturbation will either stay the same or decrease. The link equation $$\Delta_l = -\frac{\sum_{1 \le i \le m} \Delta_{f_i}}{n},$$

however, allows perturbations to grow in absolute value. This will happen whenever the sum of the flow drifts arriving at a link vertex is larger than the outdegree of such vertex: $\Sigma_{1 \le i \le m} \Delta_{f_i} > n$.

The size of the perturbation will in fact maximally increase when the link outdegree is 1 and the sum of the flow drifts arriving at it is maximal. This is achieved when the bottleneck structure is configured with flows having an outdegree of d and links having an indegree of d, connected by a stage of inter-medium links and flows of indegree and outdegree equal to 1, as shown in FIG. 19. Concatenating this bottleneck structure block, we have that at each block the perturbation increases d times. Because the length of this block is 4, there are a maximum of $$\frac{D(\mathcal{G})}{4}$$

blocks, where $D(\mathcal{G})$ is the diameter of the gradient graph. This leads to the upper bound $$\nabla_x(y) = \frac{\Delta_y}{\delta} \le d^{\frac{D(\mathcal{G})}{4}}.$$

7.6 Lemma 4 Folding Links

Let $\mathcal{N} = \{\mathcal{L}, \mathcal{F}, \{c_l, \forall l \in \mathcal{L}\}\}$ be a network and let $\mathcal{G}$ be its gradient graph. Let $\lambda$ be the leap of a gradient $\nabla_x(y)$, for some $x, y \in \mathcal{L} \cup \mathcal{F}$. Then, there exist at least two links l and l' such that: (1) for some $f \in \mathcal{F}$, there is a directed path in $\mathcal{G}$ of the form $l \rightarrow f \rightarrow l'$; and (2) $s_f = s_{f'}$, after the perturbation has propagated through the network.

Proof. Let $l \rightarrow f \rightarrow l'$ be a path in $\mathcal{G}$. From the link equation $$\Delta_l = -\frac{\sum_{1 \le i \le m} \Delta_{f_i}}{n}$$

(Lemma 3), the drift of a perturbation changes its sign every time a link is traversed. This means that, upon a perturbation, the fair shares of l or l' either distance from each other or approach to each other. If they distance from each other, they will not collide and, thus, no structural change will be incurred in the gradient graph. If they approach each other, they will collide at a point where their fair shares are equal, $s_f = s_{f'}$. At this point, the gradient graph will change, making all flows bottlenecked at one of these links also bottlenecked at the other link, and folding the two links into the same bottleneck level.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for managing network flows, the method comprising performing by a processor the steps of:
    for a network having a plurality of links and a plurality of flows active during a specified time window constructing a gradient graph comprising one or more link vertices respectively corresponding to one or more links and one or more flow vertices respectively corresponding to one or more flows, wherein the gradient graph comprises one or more link-to-flow edges from a link vertex to one or more flow vertices, indicating that respective flows corresponding to the one or more flow vertices are bottlenecked at a link corresponding to the link vertex;
    computing and storing, for each link vertex, a respective fair share of a corresponding link;
    selecting, from the plurality of flows, a flow to be accelerated;
    determining, by traversing the gradient graph, a target flow associated with a positive flow gradient;
    computing a leap and a fold for the target flow, wherein the fold comprises two links having a substantially same fair share;
    reducing a flow rate of the target flow using a traffic shaper by a factor up to the leap; and
    increasing a flow rate of the flow to be accelerated up to a product of the leap and a gradient of the flow to be accelerated.

2. The method of claim 1, wherein the gradient graph comprises one or more flow-to-link edges from a flow vertex to one or more link vertices, wherein a flow corresponding to the flow vertex traverses respective links corresponding to the respective link vertices, but is not bottlenecked at the respective links.

3. The method of claim 2, wherein at least one of the one or more link-to-flow edges comprises a bidirectional edge.

4. The method of claim 1, wherein constructing the gradient graph comprises:
    determining, for each link in the network, a number of flows bottlenecked at that link;
    summing, over the plurality of links, the respective numbers of flows bottlenecked at each link, to obtain a total number of link-to-flow edges in the gradient graph; and
    allocating memory based on, at least in part, the total number of link-to-flow edges for the gradient graph.

5. The method of claim 1, wherein the factor is selected to preserve completion time of slowest of the plurality of flows.

6. The method of claim 1, further comprising repeating the determining, computing, reducing, and increasing steps.

7. The method of claim 1, wherein the gradient graph comprises a first level of link vertices and a second, lower level of link vertices, the method further comprising, for adding a new flow to the network, designating the new flow to at least one link of the second level, to improve flow performance.

8. The method of claim 1, further comprising:
    selecting, from the plurality of links, a link for which capacity is to be increased;
    computing a leap of a gradient of the selected link; and
    increasing capacity of the selected link by up to the leap, to improve network performance.

9. The method of claim 1, wherein the network comprises a data network, a transportation network, an energy distribution network, a fluidic network, or a biological network.

10. A system for managing network flows, the system comprising:
    a first processor; and
    a first memory in electrical communication with the first processor, and comprising instructions that, when executed by a processing unit that comprises one or more computing units, wherein one of the one or more computing units comprises the first processor or a second processor, and wherein the processing unit is in electronic communication with a memory module that comprises the first memory or a second memory, program the processing unit to:
        for a network having a plurality of links and a plurality of flows active during a specified time window, construct a gradient graph comprising one or more link vertices respectively corresponding to one or more links and one or more flow vertices respectively corresponding to one or more flows, wherein the gradient graph comprises one or more link-to-flow edges from a link vertex to one or more flow vertices, indicating that respective flows corresponding to the one or more flow vertices are bottlenecked at a link corresponding to the link vertex;
        compute and store, for each link vertex, a respective fair share of a corresponding link;

select, from the plurality of flows, a flow to be accelerated;

determine, by traversing the gradient graph, a target flow associated with a positive flow gradient;

compute a leap and a fold for the target flow, wherein the fold comprises two links having a substantially same fair share;

reduce a flow rate of the target flow using a traffic shaper by a factor up to the leap; and increase a flow rate of the flow to be accelerated up to a product of the leap and a gradient of the flow to be accelerated.

11. The system of claim 10, wherein the gradient graph comprises one or more flow-to-link edges from a flow vertex to one or more link vertices, wherein a flow corresponding to the flow vertex traverses respective links corresponding to the respective link vertices, but is not bottlenecked at the respective links.

12. The system of claim 11, wherein at least one of the one or more link-to-flow edges comprises a bidirectional edge.

13. The system of claim 10, wherein to construct the gradient graph the instructions program the processing unit to:

determine, for each link in the network, a number of flows bottlenecked at that link;

sum, over the plurality of links, the respective numbers of flows bottlenecked at each link, to obtain a total number of link-to-flow edges in the gradient graph; and allocate memory based on, at least in part, the total number of link-to-flow edges for the gradient graph.

14. The system of claim 10, wherein the instructions program the processing unit to select the factor to preserve completion time of slowest of the plurality of flows.

15. The system of claim 10, wherein the instructions further program the processing unit to repeat the determine, compute, reduce, and increase operations.

16. The system of claim 10, wherein:

the gradient graph comprises a first level of link vertices and a second, lower level of link vertices; and the instructions further program the processing unit, for adding a new flow to the network, to designate the new flow to at least one link of the second level, to improve flow performance.

17. The system of claim 10, wherein the instructions further program the processing unit to:

select, from the plurality of links, a link for which capacity is to be increased;

compute a leap of a gradient of the selected link; and increase capacity of the selected link by up to the leap, to improve network performance.

18. The system of claim 10, wherein the network comprises a data network, a transportation network, an energy distribution network, a fluidic network, or a biological network.

* * * * *